(12) United States Patent
Patel et al.

(10) Patent No.: US 12,510,598 B2
(45) Date of Patent: Dec. 30, 2025

(54) ELECTRICAL CONDUCTOR APPARATUS

(71) Applicant: Rivian IP Holdings, LLC, Irvine, CA (US)

(72) Inventors: Neil Patel, Costa Mesa, CA (US); Jimmy Daisuke Spence, Ontario, CA (US); Akshay Kishor Murkute, Irvine, CA (US); Leonel Caballero Banuelos, Orange, CA (US); Nilesh Ashok Kharat, Tustin, CA (US); Tyler Jacobs, Hawthorne, CA (US); Najmeh Rahimi, Lake Forest, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 203 days.

(21) Appl. No.: 18/332,495

(22) Filed: Jun. 9, 2023

(65) Prior Publication Data

US 2024/0410951 A1 Dec. 12, 2024

(51) Int. Cl.
*G01R 31/3835* (2019.01)
*G01R 31/00* (2006.01)
*H01M 10/48* (2006.01)
*H01M 50/505* (2021.01)

(52) U.S. Cl.
CPC ....... *G01R 31/3835* (2019.01); *G01R 31/006* (2013.01); *H01M 10/482* (2013.01); *H01M 50/505* (2021.01)

(58) Field of Classification Search
None
See application file for complete search history.

(56) References Cited

U.S. PATENT DOCUMENTS

| | | | |
|---|---|---|---|
| 9,147,875 B1 * | 9/2015 | Coakley | H05K 3/0058 |
| 9,545,010 B2 | 1/2017 | Coakley et al. | |
| 9,844,148 B2 | 12/2017 | Coakley et al. | |
| 10,211,443 B2 | 2/2019 | Coakley et al. | |
| 10,944,090 B2 | 3/2021 | Collins et al. | |
| 10,964,931 B2 | 3/2021 | Coakley et al. | |
| 11,116,070 B2 | 9/2021 | Coakley et al. | |
| 11,302,997 B2 | 4/2022 | Wynn et al. | |
| 11,894,580 B2 | 2/2024 | Coakley et al. | |
| 11,979,976 B2 | 5/2024 | Coakley et al. | |
| 12,035,459 B2 | 7/2024 | Coakley et al. | |
| 12,040,511 B2 | 7/2024 | Coakley et al. | |
| 2013/0337291 A1 * | 12/2013 | Mayer | H01M 50/519 |
| | | | 429/7 |
| 2016/0020446 A1 * | 1/2016 | Zheng | H01M 50/503 |
| | | | 429/82 |
| 2016/0315304 A1 * | 10/2016 | Biskup | H01M 50/507 |
| 2018/0114960 A1 * | 4/2018 | Sato | H01M 50/209 |
| 2021/0175588 A1 | 6/2021 | Coakley et al. | |
| 2021/0265706 A1 * | 8/2021 | Yamada | B60L 50/64 |
| 2023/0261331 A1 * | 8/2023 | Morton | H01M 50/271 |
| | | | 429/163 |
| 2025/0007131 A1 | 1/2025 | Patel et al. | |

* cited by examiner

*Primary Examiner* — Jas A Sanghera
(74) *Attorney, Agent, or Firm* — Foley & Lardner LLP

(57) ABSTRACT

A current collector can include an electrically conductive layer. The electrically conductive layer can be configured to electrically couple to a first battery cell and a second battery cell with an interstitial area between the first battery cell and the second battery cell. The current collector can include an isolation layer. The isolation layer can define an aperture. The aperture can form a path through the isolation layer to the interstitial area.

17 Claims, 16 Drawing Sheets

ELECTRICAL CONDUCTOR APPARATUS

INTRODUCTION

An electric vehicle includes battery cells that are electrically coupled together to provide power for the electric vehicle.

SUMMARY

A battery pack or battery module can include a current collector and a voltage sensing device coupled to battery cells. The current collector can include at least one aperture through an isolation layer to form a path for potting material to move into an interstitial space between the battery cells of the battery module. The current collector can include cell tabs to electrically couple the current collector with the battery cells. For example, the current collector can include at least one tab having a geometry to increase a weldable area on a terminal (e.g., a rim-style terminal or button-style terminal) of the battery cells. The geometry can, for example, cover 80% or more of an area of the terminal. The tab can include a material thickness to allow a narrow fuse of the tab. The current collector can include a coverlay layer having a notch (e.g., scaled-back area, cutout) around the fuse to allow the fuse to move relative to the current collector and improve mechanical yielding. The current collector can be coupled with the voltage sensing device. The voltage sensing device can be a voltage sensing harness (VSH). The voltage sensing harness can include a connector portion (e.g., a VSH tail) having at least one opening to receive a grommet pin, the grommet pin to couple the VSH tail to the battery module (e.g., to a busbar of the battery module). The voltage sensing harness can also include a plurality of voltage sensing regions that can minimize a direct current internal resistance (DCIR) spread between the various sections, of the current collector. For example, the current collector can include a plurality of sections (e.g., "P-groups"), and the voltage sensing harness can include at least one voltage sensing region for each section. Each of the voltage sensing regions can be spaced apart from an adjacent voltage sensing region by a uniform distance. The voltage sensing harness can remove or substantially reduce trace redundancy, such as by omitting a voltage sensing harness trace fuse or omitting a second set of trace fuses and retaining a single trace fuse.

At least one aspect is directed to an apparatus. The apparatus can be a current collector. The current collector can include an electrically conductive layer. The electrically conductive layer can be configured to electrically couple to a first battery cell and a second battery cell with an interstitial area between the first battery cell and the second battery cell. The current collector can include an isolation layer. The isolation layer can define an aperture. The aperture can form a path through the isolation layer to the interstitial area.

At least one aspect is directed to an apparatus. The apparatus can be a current collector. The current collector can include a coverlay layer and an electrically conductive layer. The coverlay layer can include a notch. The electrically conductive layer can include a tab and a fuse. The tab can electrically couple the electrically conductive layer with a battery cell. The electrically conductive layer can be positioned relative to the coverlay layer such that the notch of the coverlay layer is positioned over at least a portion of the fuse.

At least one aspect is directed to a device. The device can be a voltage sensing device. The voltage sensing device can include a plurality of voltage sensing regions. The voltage sensing device can be configured to couple with a current collector to measure a voltage of the current collector within the plurality of voltage sensing regions. The voltage sensing device can include each of the plurality of voltage sensing regions spaced apart from an adjacent voltage sensing region by a distance.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of battery packs and current collectors therefor. The various concepts introduced above and discussed in greater detail below may be implemented in any of numerous ways.

This disclosure is generally directed to a current collector assembly (CCA) for a battery module. A current collector of the CCA can include potting cutouts to improve potting fill in an interstitial space between battery cells of the battery module. For example, the current collector can include multiple cutouts to allow potting material to flow into the interstitial space underneath S-bend areas of the current collector. The current collector can include cell tabs to electrically couple the current collector with the battery cells. For example, the current collector can include cell tabs having a geometry to increase a weldable area on a terminal (e.g., a rim-style terminal or button-style terminal) of the battery cells. The geometry can, for example, cover 80% or more of an area of the terminal. The current collector can include a coverlay layer with a notch (e.g., scaled-back area, cutout) around the fuse to allow the fuse to move relative to the current collector and improve mechanical yielding. The current collector can be coupled with a voltage sensing device, such as a voltage sensing harness ("VSH"). The voltage sensing harness can include a connector portion (e.g., a VSH tail) having at least one opening to receive a grommet pin, the grommet pin to couple the VSH tail to the battery module. The voltage sensing harness can also include a plurality of voltage sensing regions that can minimize a DCIR spread between the various sections, portions, or segments of current collector. For example, the current collector can include a plurality of P-groups, and the voltage sensing harness can include at least one voltage sensing region for each P-group. Each of the voltage sensing regions can be spaced apart from an adjacent voltage sensing region by a uniform distance. Further, the voltage sensing harness can remove or substantially reduce trace redundancy, such as by omitting a voltage sensing harness trace fuse or omitting a second set of trace fuses and retaining a single trace fuse.

Figure 1:
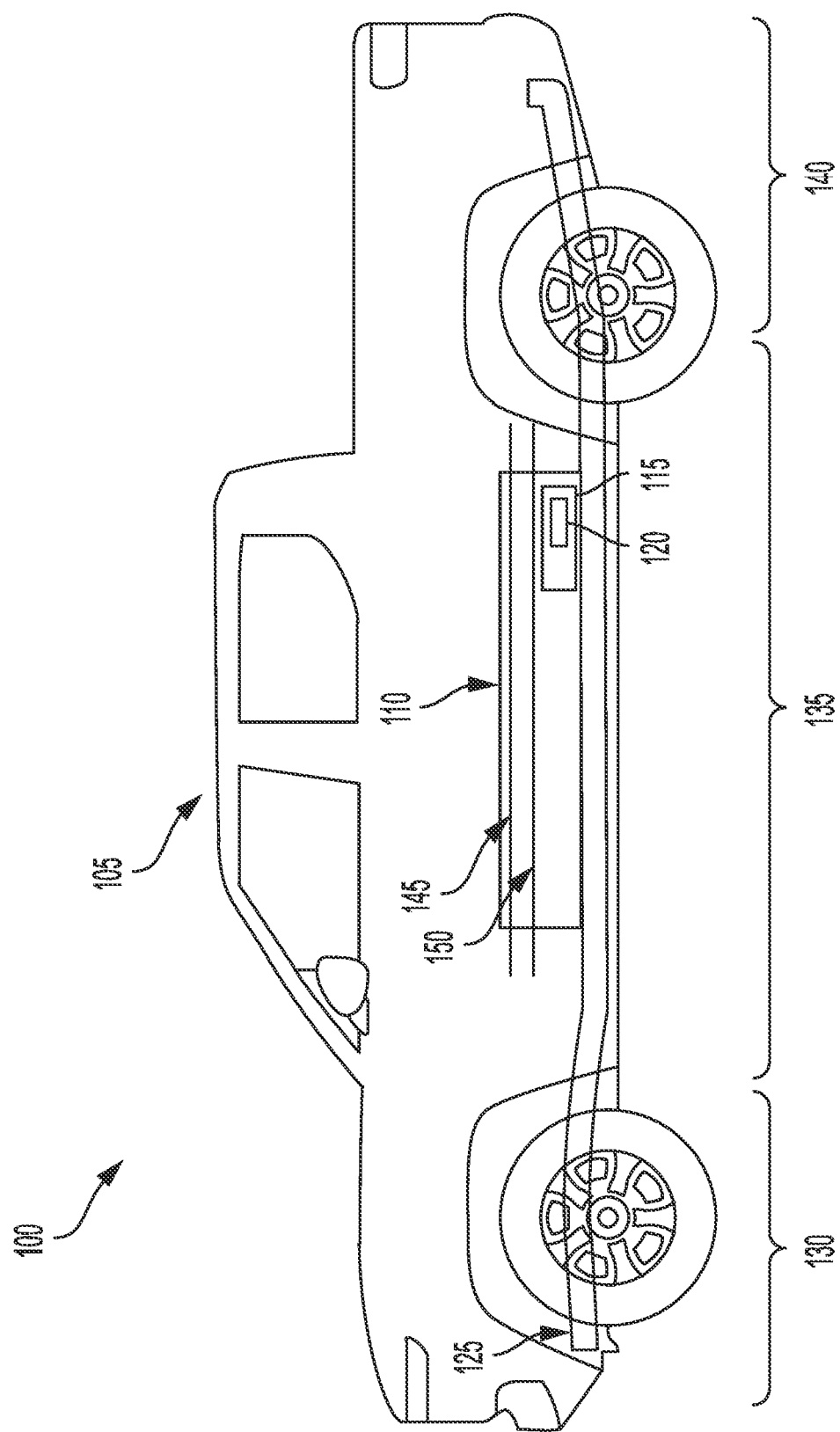
FIG. 1 depicts an example electric vehicle, in accordance with some aspects.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2:
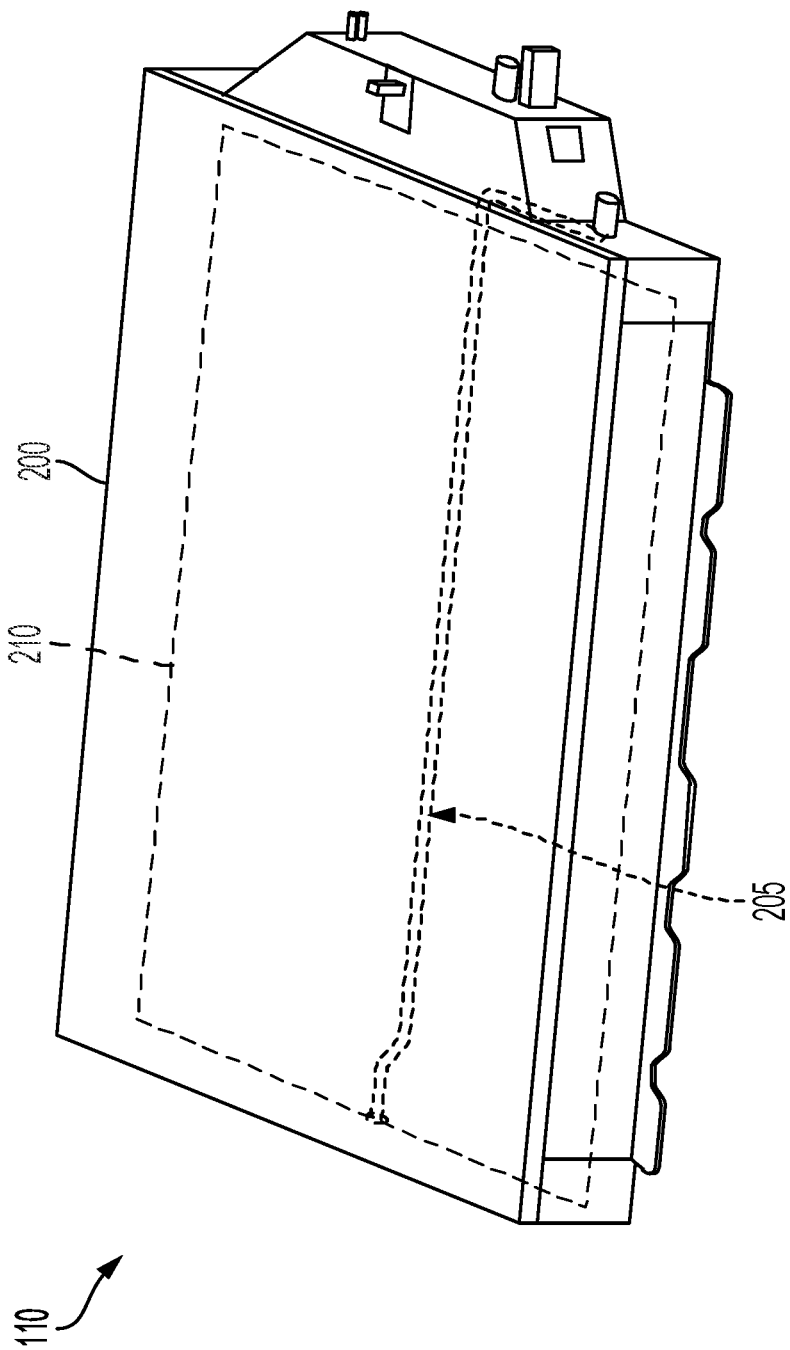
FIG. 2 depicts an example battery pack, in accordance with some aspects.

FIG. 2 depicts an example battery pack 110. Referring to FIG. 2, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 200. The housing 200 can include at least one battery module 115 or at least one battery cell 120, as well as other battery pack components. The battery module 115 can be or can include one or more groups of prismatic cells, cylindrical cells, pouch cells, or other form factors of battery cells 120. The housing 200 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 205 that can distribute fluid through the battery pack 110 as part of a thermal/temperature control or heat exchange system that can also include at least one thermal component (e.g., cold plate) 210. The thermal component 210 can be positioned in relation to a top submodule and a bottom submodule, such as in between the top and bottom submodules, among other possibilities. The battery pack 110 can include any number of thermal components 210. For example, there can be one or more thermal components 210 per battery pack 110, or per battery module 115. At least one cooling line 205 can be coupled with, part of, or independent from the thermal component 210.

Figure 3:
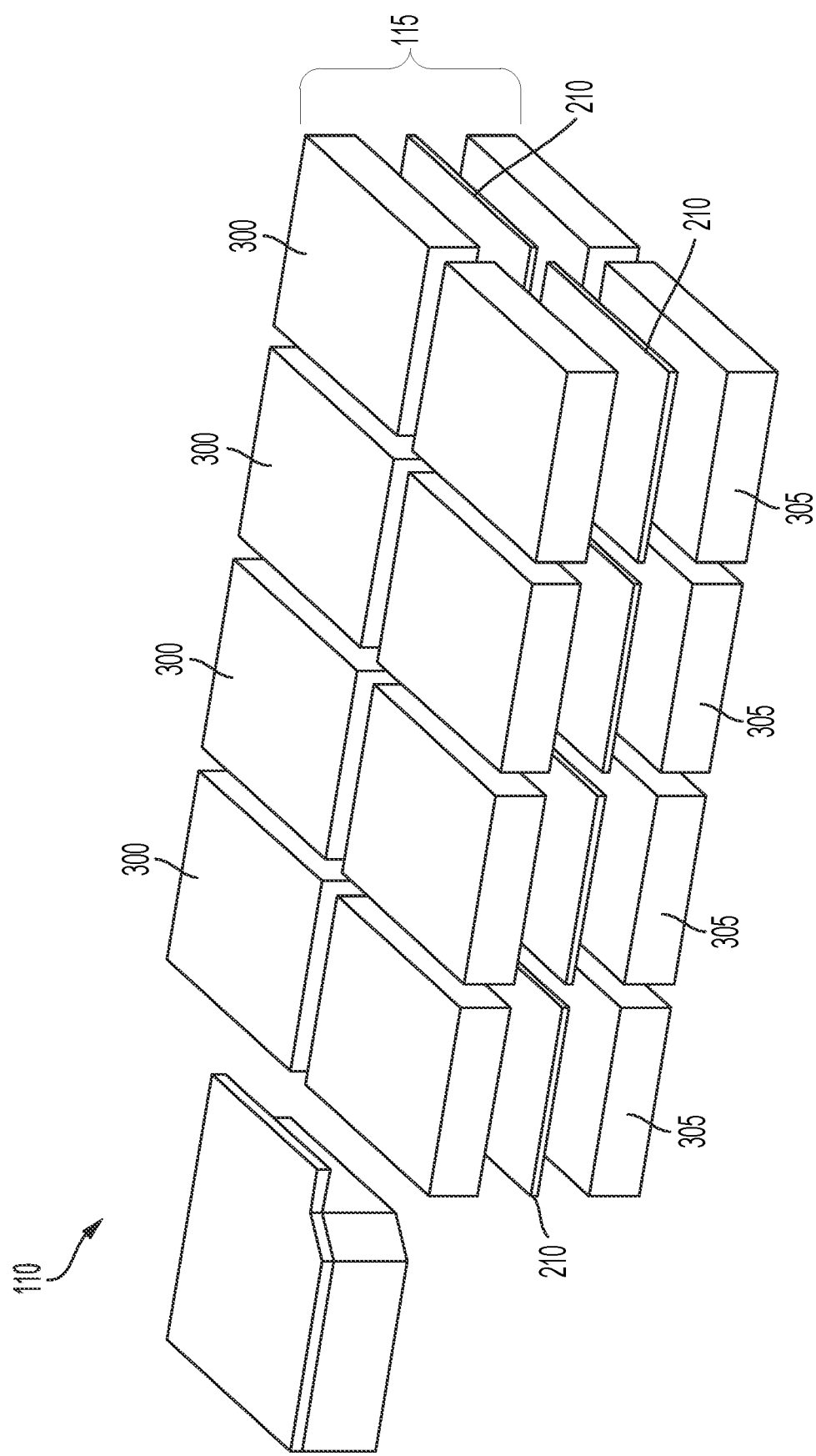
FIG. 3 depicts an example battery module, in accordance with some aspects.

FIG. 3 depicts example battery modules 115. The battery modules 115 can include at least one submodule. For example, the battery modules 115 can include at least one first (e.g., top) submodule 300 or at least one second (e.g., bottom) submodule 305. At least one thermal component 210 can be disposed between the top submodule 300 and the bottom submodule 305. For example, one thermal component 210 can be configured for heat exchange with one battery module 115. The thermal component 210 can be disposed or thermally coupled between the top submodule 300 and the bottom submodule 305. One thermal component 210 can also be thermally coupled with more than one battery module 115 (or more than two submodules 300, 305). The thermal components 210 shown adjacent to each other can be combined into a single thermal component 210 that spans the size of one or more submodules 300 or 305. The thermal component 210 can be positioned underneath submodule 300 and over submodule 305, in between submodules 300 and 305, on one or more sides of submodules 300, 305, among other possibilities. The thermal component 210 can be disposed in sidewalls, cross members, structural beams, among various other components of the battery pack, such as battery pack 110 described above. The battery submodules 300, 305 can collectively form one battery module 115. In some examples each submodule 300, 305 can be considered as a complete battery module 115, rather than a submodule.

The battery modules 115 can each include a plurality of battery cells 120. The battery modules 115 can be disposed within the housing 200 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 200. It should also be noted that each battery module 115 may include a top submodule 300 and a bottom submodule 305, possibly with a thermal component 210 in between the top submodule 300 and the bottom submodule 305. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 300 and 305. The battery cells 120 can be disposed in the battery pack 110 in a cell-to-pack configuration without modules 300 and 305, among other possibilities.

Figure 4:
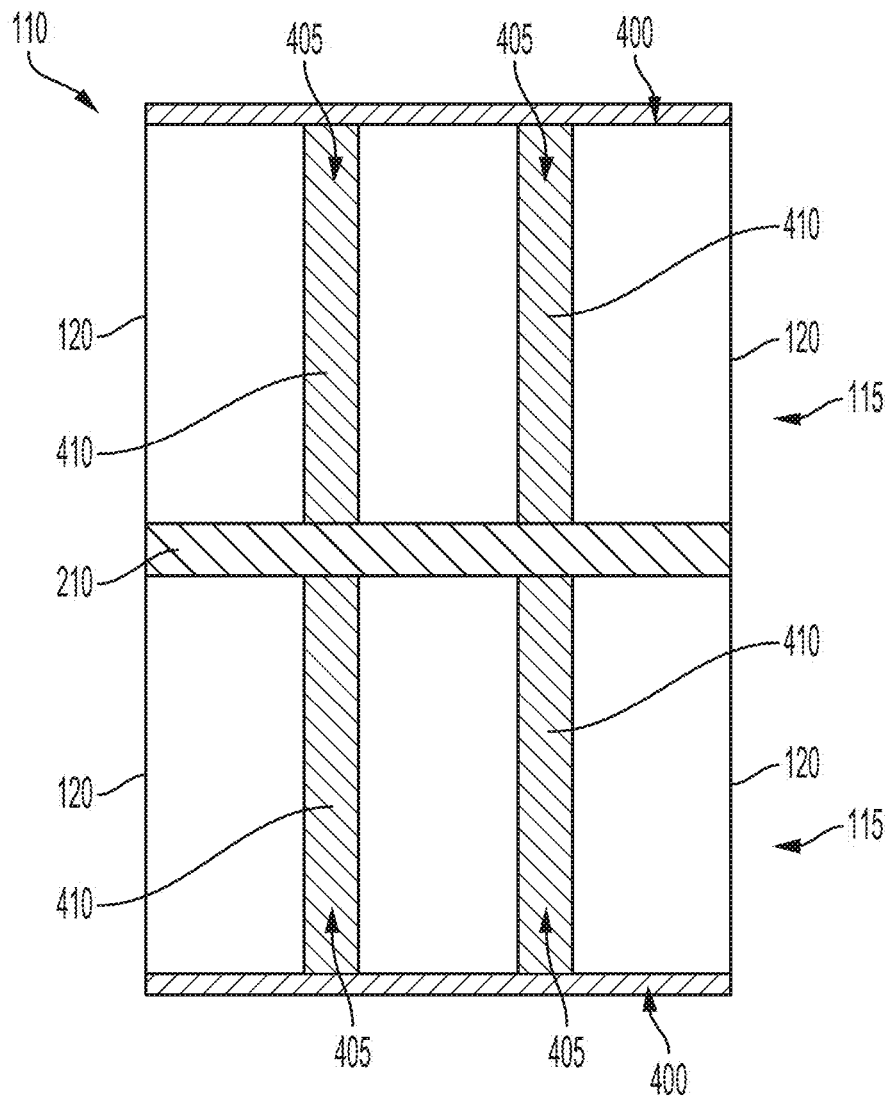
FIG. 4 depicts an example cross-section battery pack, in accordance with some aspects.

As depicted in FIG. 4, among others, the battery module 115 can include a plurality of battery cells 120 and at least one current collector 400. The current collector 400 can include an electrically conductive member that can electrically couple multiple battery cells 120 with each other. For example, the current collector 400 can electrically couple multiple battery cells 120 together in a series configuration, a parallel configuration, or some other configuration, such as by physically contacting one or more terminals of the multiple battery cells 120. The battery pack 110 can include one current collector 400 for each battery module 115. For example, as depicted in FIG. 4, among others, each module 115 can include multiple battery cells 120 and one current collector 400 to electrically couple the battery cells 120 together.

Figure 5:
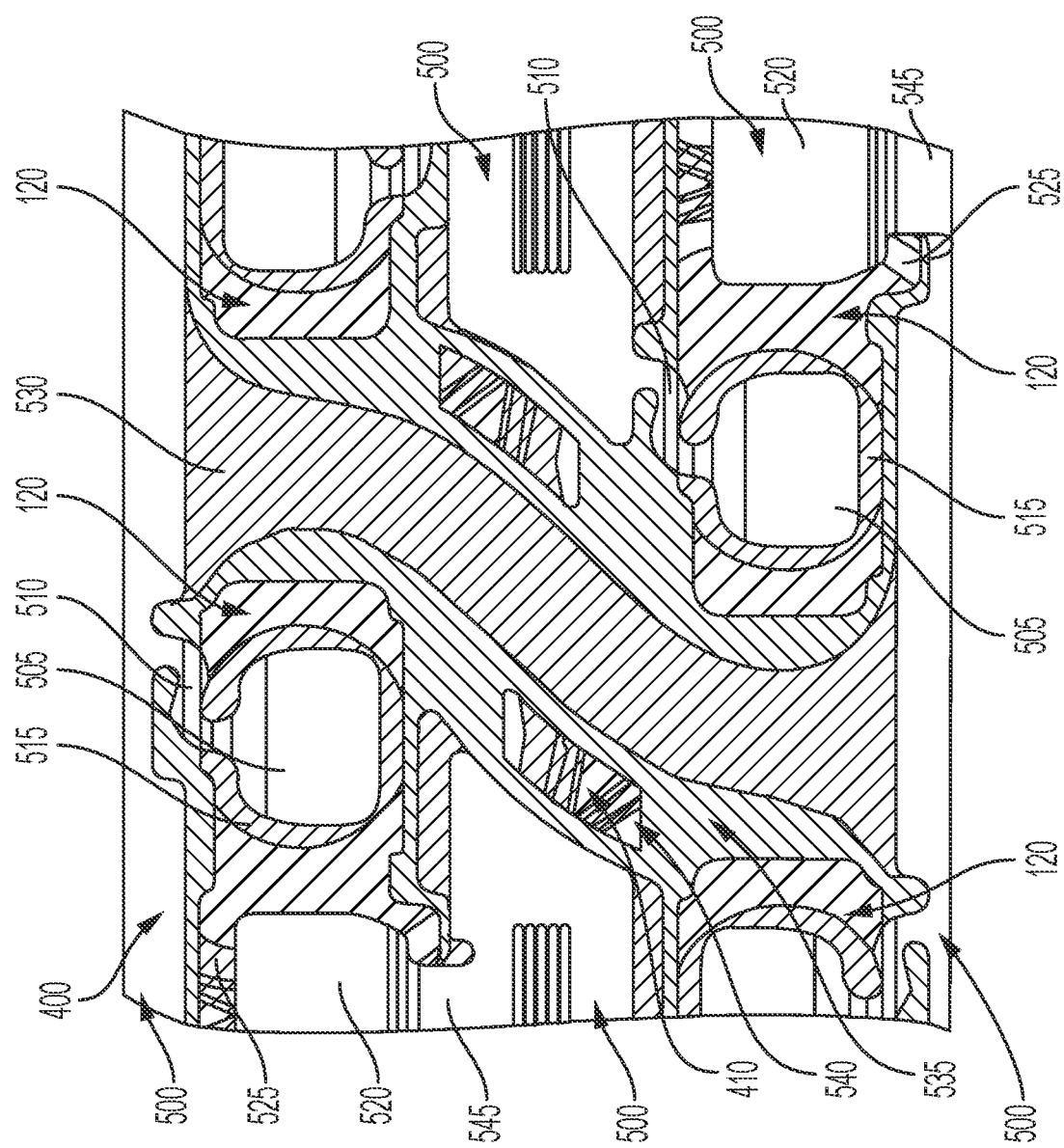
FIG. 5 depicts an example current collector, in accordance with some aspects.
Figure 16:
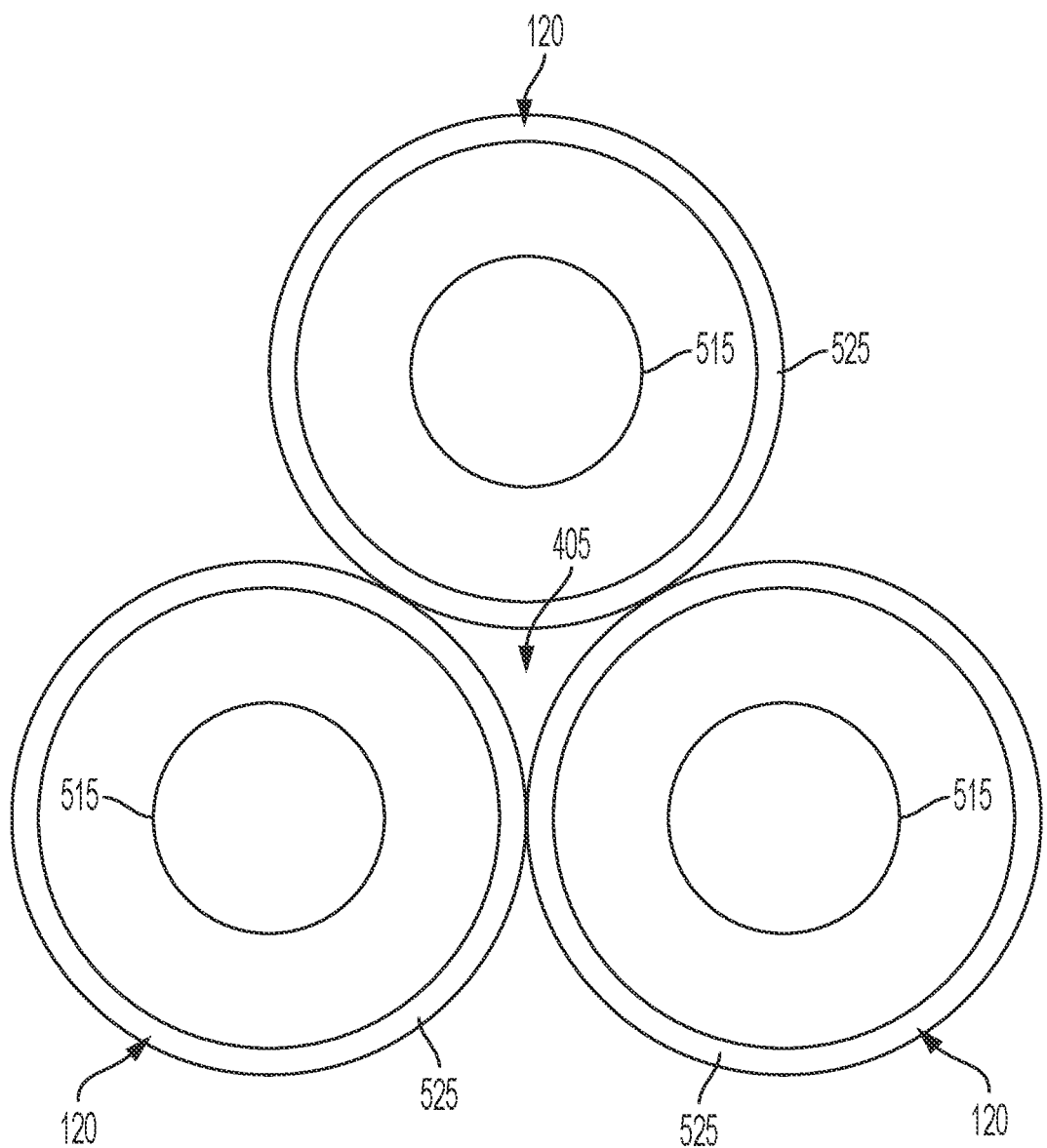
FIG. 16 depicts an example interstitial area between battery cells, in accordance with some aspects.

The battery cells 120 can be positioned adjacent to one another such that at least a portion of battery cells 120 are in contact (e.g., touching, abutting) with at least one adjacent battery cell 120. The battery cells 120 can be positioned such that at least a portion of a battery cell 120 are not in contact with an adjacent battery cell 120. For example, as depicted in FIGS. 4, 5, and 16, due to the arrangement, configuration, and shapes of the battery cells, the battery cells 120 can be positioned relative to at least one adjacent battery cell 120 with an interstitial area 405 positioned between the adjacent battery cells 120. The interstitial area 405 can include a space, gap, opening, or cavity positioned between adjacent battery cells 120. The battery cells 120 can be completely or partially enveloped by the interstitial area 405 in a radial direction. For example, if a battery cell 120 is not contacting any adjacent battery cell 120, the interstitial area 405 can surround a radial surface of the battery cell 120 in a radial direction (e.g., excluding a top and bottom, which can be coupled with the current collector 400 or a thermal component 210, for example). In the examples in which a portion of the battery cell 120 contacts at least one adjacent battery cell 120, the interstitial area 405 can partially surround the battery cell 120. For example, multiple discrete (e.g., separated, individual) interstitial areas 405 can exist within the module 115, with each interstitial area 405 separated from other interstitial areas 405 because of at least two battery cells abutting (e.g., contacting, touching) each other. The interstitial area 405 can exist as a product of a shape, arrangement, and configuration of the battery cells 120. For example, the battery cells 120 can be cylindrical in form such that a group of multiple (e.g., three, four, or some other number) of neighboring battery cells 120 can only contact each other along a line or an edge, rather than a surface (as may be the case with prismatic battery cells 120, for example). The module 115 can include cylindrical battery cells 120 with battery cells 120 oriented in staggered rows within the module 115 such that three battery cells 120 can be arranged in a triangular orientation with a generally triangular interstitial area 405 positioned therebetween, as is depicted in FIG. 16, among others.

With the battery module 115 assembled (e.g., with the battery cells 120 of the module 115 positioned adjacent one another and the current collector 400 coupled to the battery cells), multiple interstitial areas 405 are present. For example, the battery cells 120 can be cylindrical battery cells 120 positioned between the current collector 400 and the thermal component 210. During assembly of the battery module 115, the interstitial area 405 can be filled with a potting material 410, such as, such as a polyurethane material, a silicon material, an epoxy material, or some other material. For example, the potting material 410 can be or include a syntactic polyurethane, a foaming polyurethane, or some other polyurethane material. The potting material 410 can be or include a solid silicon, semi-solid silicon, syntactic silicon, or some other silicon. The potting material 410 can be or include a solid epoxy, a foaming epoxy, or some other epoxy. For example, the potting material 410 can include some combination of polyurethane, silicon, epoxy, or some other material. For example, after the current collector 400 is positioned against the battery cells 120 (e.g., welded to battery terminals of the battery cells 120 to electrically couple the battery cells together 120), a viscous, semi-viscous, or liquid potting material 410 can be poured over the current collector 400. The potting material 410 can flow into the interstitial areas 405. The potting material 410 can cure, harden, solidify, or otherwise reside within the interstitial areas 405 to provide for thermal insulation or electrical insulation between adjacent batter cells 120 of the battery module 115.

As depicted in FIG. 5, among others, the current collector 400 can include at least one electrically conductive layer 500 and an isolation layer 535. For example, the current collector 400 can include a first electrically conductive layer 500 and a second electrically conductive layer 530. The first electrically conductive layer 500 and the second electrically conductive layer 530 can be electrically coupled together. The first electrically conductive layer 500 can include at least one tab 505 and at least one fuse 510 for each tab 505. For example, the tab 505 can be a first tab 505 that can couple with a first terminal 515 of a battery cell 120. The fuse 510 can electrically couple the tab 505 with a remainder (e.g., a main body) of the electrically conductive layer 500. The fuse 510 can include a relatively thin, narrow, or slender portion of the electrically conductive layer 500. For example, the fuse 510 can be flexible to allow the tab 505 to bend or articulate slightly such that the tab 505 is positioned on (e.g., against, to abut, to contact) the battery terminal 515. Though the fuse 510 is bendable or flexible, it is important that the fuse 510 also be resistant to breakage or mechanical yielding.

The electrically conductive layer 500 can include at least one second tab 520 and at least one second fuse 545. The second tab 520 can couple with at least one second terminal 525 of a battery cell 120. For example, the second tab 520 of the electrically conductive layer 500 can couple with a second terminal 525 of a first battery cell 120 and another second terminal 525 (e.g., a third terminal) of an adjacent battery cell 120 (e.g., a second battery cell 120.) In this way, the second tab 520 can be coupled simultaneously to two terminals 525, including one terminal 525 of one battery cell 120 and another terminal 525 of another battery cell 120. The second terminal 525 of the battery cell 120 can have a polarity opposite that of the first terminal 515. For example, the second terminal 525 can have a negative polarity, whereas the first terminal 515 can have a positive polarity, or vice versa. The second tab 520 can be coupled with the second fuse 545. The fuse 545 can electrically couple the second tab 520 with a remainder (e.g., a main body) of the electrically conductive layer 500. The fuse 545 can include a relatively thin, narrow, or slender portion of the electrically conductive layer 500. For example, the fuse 545 can be flexible to allow the second tab 520 to bend or articulate slightly such that the second tab 520 is positioned on (e.g., against, to abut, to contact) the battery terminal 525. Though the fuse 545 is bendable or flexible, it is important that the fuse 545 also be resistant to breakage or mechanical yielding.

The electrically conductive layer 500 can include a material thickness. For example, the material thickness of the electrically conductive layer 500 can be greater than 125 μm. The material thickness of the electrically conductive layer 500 can be 150 μm, 125-150 μm, or greater than 150 μm. With a thickness of 150 μm, for example, the fuse 510 or the fuse 545 can be narrower (e.g., have less lateral width) than in examples where the material thickness is 125 μm or less than 125 μm. For example, the thickness of 150 μm can provide adequate material strength such that the fuse 510 can include a width of 1.0 mm. The fuse 510 can have a width of less than 1.2 mm, 1.0-1.2 mm, or less than 1.0 mm because the material thickness of the electrically conductive layer 500 (and thus the fuse 510 of the electrically conductive layer 500 is sufficiently thick. The width of the fuse 510, for example, can be approximately 5-80% of a width of the tab 505. The width of the tab 505 can permit at least two passes (e.g., paths, series, groups) of welds to be created to join the fuse 510 with the battery terminal 515. The width of the fuse 545 can be approximately 50-95% of a width of the tab 520, for example. For example, the width of the tab 520 can permit at least two passes (e.g., paths, series, groups) of welds to be created to join the fuse 520 with the battery terminal 525.

Figure 6:
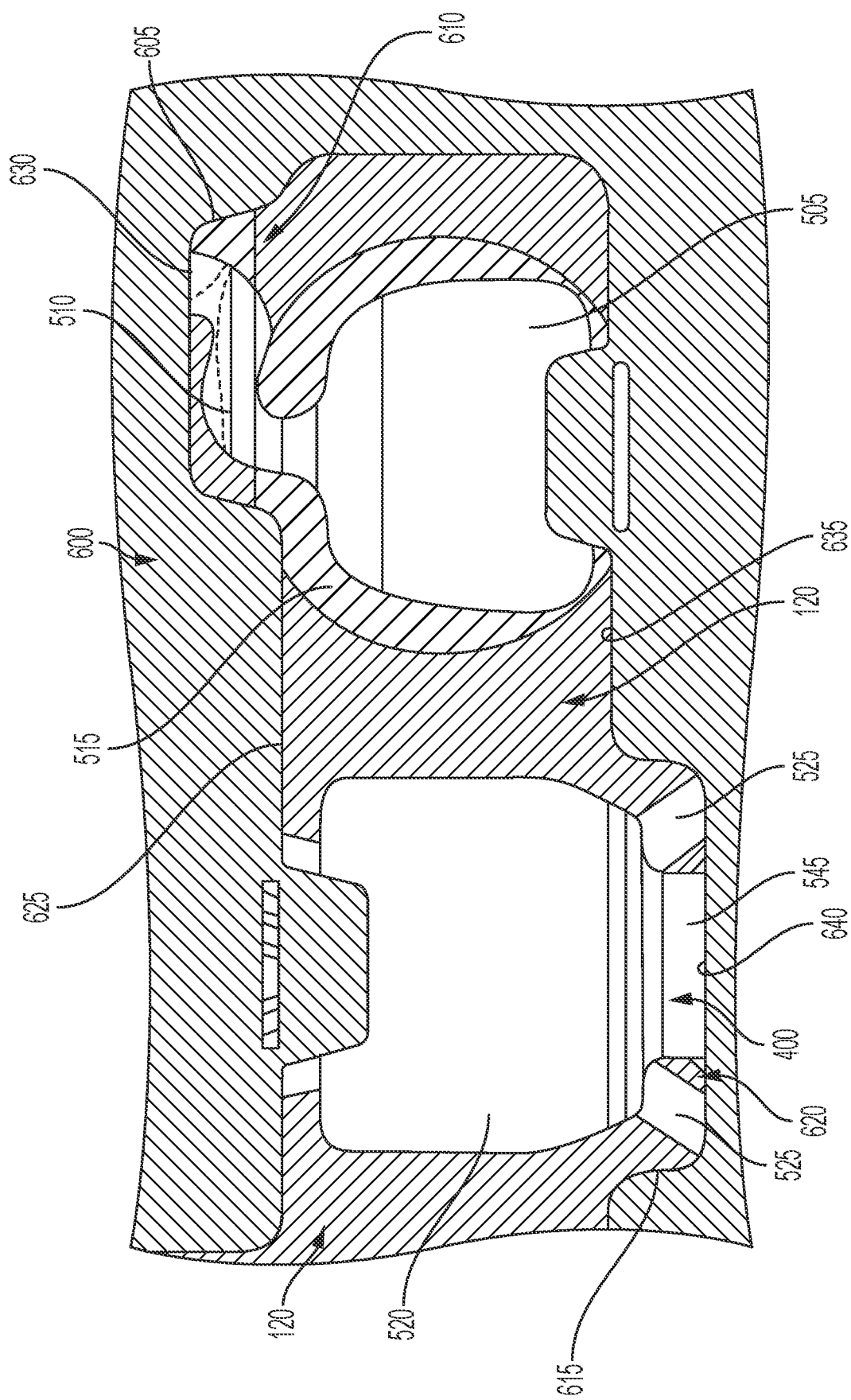
FIG. 6 depicts an example current collector, in accordance with some aspects.

As depicted in FIGS. 5 and 6, among others, the first terminal 515 can include a button-style terminal. For example, the first terminal 515 can include a generally cylindrical protrusion extending from the battery cell 120. The first terminal 515 can have an area (e.g., a surface area) within which the first tab 505 can be electrically coupled with the first terminal 515. For example, the first terminal 515 can define an upper surface or area having a generally circular shape or some other shape. The first terminal 515 can include some other shape or profile. For example, the first terminal 515 can include a rectangular protrusion or indentation of the battery cell 120. The first tab 505 can have a shape or profile. The shape or profile of the first tab 505 can be similar to the shape of the first terminal 515 or different than the shape of the first terminal 515. As depicted in FIGS. 5 and 6, among others, the first tab 505 can have a rounded shape. The first tab 505 can be positioned relative to the first terminal 515 such that the first tab 505 is positioned over a substantial portion (e.g., more than 50%) of the area of the first terminal 515. For example, the first tab 505 can be positioned relative to the first terminal 515 such that the first tab 505 is positioned over a 70-80%, 80-90% or more than 90% of the area of the first terminal 515. The first tab 505 can be positioned over a substantial portion of the first terminal 515 to provide ample weldable area for a welding device (e.g., a laser welding device) to weld the first tab 505 to the first terminal 515. For example, the weldable area can include an area of the first tab 505 that is positioned over the first terminal 515 of the battery cell 120. Substantially all (e.g., greater than 95%) of the area of the first tab 505 can be positioned over the first terminal 515, and the first tab 505 can be positioned over a substantial portion (e.g., 80%) of the area of the first terminal 515 such that approximately (e.g., ±10%) 80% of the area of the first terminal 515 is weldable area. For example, a laser welding device has sufficient weldable area to create two or more weld joints to electrically couple the tab 505 and the first terminal 515 with the first tab 505 positioned over a substantial portion (e.g., 80%) of the area of the first terminal 515.

The second terminal 525 can include a rim-style terminal. For example, the second terminal 525 can include a portion of an outer radial edge or rim of the battery cell 120 in the case of cylindrical battery cells 120. The second tab 520 can include some other shape or profile. For example, the second terminal 525 can include a tab, protrusion, button, or indentation having some shape (e.g., circular, rectangular, triangular, or some other shape). The second tab 520 can include a shape or profile at least partially corresponding to a shape or profile of the second terminal 525. For example, the second terminal 525 can include a rim-style terminal, and the second tab 520 can include an elongated, rectangular shape such that the second tab 520 can be positioned over a sufficient area of the second terminal 525 to provide for a sufficient weldable area (e.g., an area within which a laser welder can successfully weld the second tab 520 to the second terminal 525). The second tab 520 can include a shape or profile at least partially corresponding to a shape or profile of the terminal 525 of a first battery cell 120 and the terminal 525 of a second battery cell 120, such as instances when the second tab 520 is coupled with the second terminal 525 of two battery cells 120 positioned adjacent to one another.

As depicted in FIG. 5, among others, the electrically conductive layer 500 can include an isolation layer 535. The isolation layer 535 can include a non-electrically conductive layer such that electricity is not conducted by the isolation layer 535. For example, the isolation layer 535 can be positioned between two electrically conductive layers of the current collector 400. The isolation layer 535 can be positioned between the electrically conductive layer 500 and the battery cells 120. For example, at least a portion of the isolation layer 535 can be positioned with the electrically conductive layer to a side (e.g., an upper side) of the isolation layer 535 and with the first battery cell 120 and the second battery cell 120 to an opposite side (e.g., a lower side) of the isolation layer 535. The isolation layer can generally separate the battery cells 120 of the battery module 115 from the electrically conductive layer 500 such that the only electrical connection between the electrically conductive layer 500 and the battery cells 120 is via the first tab 505 or the second tab 520 and the first terminal 515 or the second terminal 525, respectively. The isolation layer 535 can cover a substantial portion (e.g., 75%, greater than 75%, or some other percentage) of a surface area of the battery cells 120. For example, only a small portion of the battery cells 120 can be visible through the current collector 400 with the current collector 400 on (e.g., against, atop, coupled with) the battery cells 120 of the battery module 115. Accordingly, the interstitial area 405 between the battery cells 120 of the battery module 115 can also be at least partially covered by the isolation layer 535. For example, the isolation layer 535—in addition to the other layers of the current collector 400—can overlap at least a portion of the interstitial area 405 existing between adjacent battery cells 120.

The isolation layer 535 can define an aperture 540. The aperture 540 can include a hole, opening, space, gap, or void through the isolation layer 535. The aperture 540 can form a path through the isolation layer 535. For example, a material such as a viscous, semi-viscous, liquid, or particulate material can pass through the isolation layer 535 via the aperture 540. The aperture 540 can be positioned on the isolation layer 535 to provide a path through the isolation layer 535 to the interstitial area 405. For example, the aperture 540 can be positioned relative to the battery cells 120 such that the aperture 540 at least partially overlaps the interstitial area 405 between adjacent battery cells 120. In this way, a material (e.g., a viscous, semi-viscous, liquid, or some other material) can pass through the aperture 540 of the isolation layer 535 to reach the interstitial area 405. The aperture 540 can include a rectangular shape or profile, an arcuate shape or profile, a circular shape or profile, or some other shape or profile. For example, as depicted in FIG. 5, among others, the aperture 540 can have an arcuate shape. The arcuate shape can follow a profile or contour of the electrically conductive layer 530 or some other part of the current collector 400. The aperture 540 can have a shape, dimension, and position in order to retain a mechanical integrity of the current collector 400 and to provide a path to the interstitial area 405. For example, the aperture 540 can include a shape (e.g., arcuate, circular, rectangular, oblong, or some other shape), a dimension (e.g., size, length, width), and a position (e.g., a location on the isolation layer 535 relative to an edge of the isolation layer 535, a location relative to another part of the current collector 400) selected to provide a path to the interstitial area 405 through the isolation layer 535 without compromising the integrity of the isolation layer 535 or the current collector more generally. For example, the aperture 540 can be positioned on the isolation layer 535 in order to maintain a minimum material thickness (e.g., width, wall thickness) between an edge of the aperture 540 and an edge of the isolation layer 535. The aperture 540 can include a shape or dimension such that the aperture 540 is similarly shaped or sized to the interstitial area 405. For example, the aperture 540 can have a generally triangular shape with the interstitial area 405 also having a generally triangular shape (as in the case of three cylindrical battery cells 120 positioned adjacent to one another to form the interstitial area 405).

Because the potting material 410 is provided to the interstitial area 405 after the current collector 400 is positioned on (e.g., against, coupled to, welded to) the battery cells 120, the current collector 400 can impede a flow or movement of the potting material 410 into the interstitial area 405. The interstitial area 405 can be insufficiently filled (e.g., only 10% filled, only 50% filled, less than 50% filled, less than 80% filled) with potting material 410 with the flow or movement of the potting material 410 at least partially impeded. As a consequence, the battery module 115 or battery pack 110 can have poor or diminished thermal properties or electrically insulative properties with the interstitial area 405 insufficiently filled with the potting material 410. The aperture 540 of the isolation layer 535 can be configured to form a path through the isolation layer 535 and into the interstitial area 405 to direct the potting material 410 into the interstitial area 405. For example, the aperture 540 of the isolation layer 535 can be positioned at least partially over (e.g., at least partially overlap) the interstitial area 405 such that a direct flow path is created through the isolation layer 535 and into the interstitial area 405. An amount of potting material 410 is permitted to freely or more easily flow or pour into the interstitial area 405 via the aperture 540 than if the aperture 540 were not present. For example, without the aperture 540, the current collector 400 would at least partially impede a flow or movement of the potting material 410 into the interstitial area 405, which can prevent the interstitial area 405 from being filled or substantially filled (e.g., 80% or more filled) with the potting material 410. With the aperture 540, however, the interstitial area 405 can be substantially filled (e.g., 80% filled, 90% filled, 95% filled, or greater than 95% filled) with the potting material 410 directed through the aperture 540 of the isolation layer 535 and into the interstitial area 405. The aperture 540 can improve potting fill density by facilitating movement (e.g., flow) of the potting material 410 into the interstitial area 405, which can eventually improve module thermal runaway performance of the battery module 115, among other benefits.

The electrically conductive layer 500 can include at least one coverlay layer 600. For example, the coverlay layer can include a non-electrically conductive layer (e.g., an insulative layer) positioned on (e.g., against, abutting) the electrically conductive layer 500. For example, the coverlay layer 600 can be positioned on top of the electrically conductive layer 500. The electrically conductive layer 500 can be positioned at least partially between the coverlay layer 600 and the isolation layer 535. The electrically conductive layer 500 can be positioned at least partially between the coverlay layer 600 and the battery cell 120, for example.

The coverlay layer 600 can include at least one notch. For example, the coverlay layer 600 can include a notch 610. The notch 610 can be defined by an edge 605 of the coverlay layer 600. The notch 610 can include a cutout, recess, indentation in the coverlay layer 600. For example, a boundary 630 of the notch 610 can be offset from a boundary 625 of an un-notched portion of the coverlay layer 600. A greater portion of an object beneath the coverlay layer 600 can be visible or accessible because of the notch 610. For example, the notch 610 can reduce a surface area of the coverlay layer 600. The notch 610 can be positioned strategically over the fuse 510 such that the fuse 510 is not covered by the coverlay layer 600 with the coverlay layer 600 positioned on (e.g., against, over, abutting) the electrically conductive layer 500. For example, the electrically conductive layer 500 can be positioned relative to the coverlay layer 600 such that the notch 610 of the coverlay layer 600 is positioned over at least a portion of the fuse 510. The coverlay layer 600 can cover a portion of the electrically conductive layer 500 adjacent to the fuse 510 but can avoid covering at least a portion of the fuse 510. The portion of the fuse 510 that is not covered by the coverlay layer 600 can avoid contacting the coverlay layer 600. For example, the notch 610 can allow a movement of the at least a portion of the fuse 510 and at least a portion of the tab 505 without either the portion of the fuse 510 or the portion of the tab 505 contacting the coverlay layer 600. Accordingly, the notch 610 of the coverlay layer 600 can allow the fuse 510 to bend, articulate, or otherwise move with greater freedom and without contacting the coverlay layer 600. Because the fuse 510 can bend, articulate, or otherwise move with greater freedom, the tab 505 can more readily be positioned or adjusted on the terminal 515 of the battery cell 120, which can facilitate or improve a subsequent welding operation to couple (e.g., weld) the tab 505 with the terminal 515. Because the fuse 510 can bend, articulate, or otherwise move without contacting the coverlay layer 600, the potential for damage to the fuse 510 or the coverlay layer 600 resulting from contact between the fuse 510 or the coverlay layer 600 can be reduced. The coverlay layer 600 can be positioned relative to the isolation layer 535 such that at least a portion of the notch 610 is positioned over the isolation layer 535. For example, the fuse 510 can be positioned between the isolation layer 535 and the notch 610.

The coverlay layer 600 can include at least second notch 620. The notch 620 can be defined by an edge 615 of the coverlay layer 600. The notch 620 can include a cutout, recess, indentation in the coverlay layer 600. For example, a boundary 640 of the notch 620 can be offset from a boundary 635 of an un-notched portion of the coverlay layer 600. A greater portion of an object beneath the coverlay layer 600 can be visible or accessible because of the notch 620. For example, the notch 620 can reduce a surface area of the coverlay layer 600. The notch 620 can be positioned strategically over the fuse 545 such that the fuse 545 is not covered by the coverlay layer 600 with the coverlay layer 600 positioned on (e.g., against, over, abutting) the electrically conductive layer 500. For example, the electrically conductive layer 500 can be positioned relative to the coverlay layer 600 such that the notch 610 of the coverlay layer 600 is positioned over at least a portion of the fuse 545. The coverlay layer 600 can cover a portion of the electrically conductive layer 500 adjacent to the fuse 545 but can avoid covering at least a portion of the fuse 545. The portion of the fuse 545 that is not covered by the coverlay layer 600 can avoid contacting the coverlay layer 600. For example, the notch 620 can allow a movement of the at least a portion of the fuse 545 and at least a portion of the tab 520 without either the portion of the fuse 545 or the portion of the tab 520 contacting the coverlay layer 600. Accordingly, the notch 620 of the coverlay layer 600 can allow the fuse 545 to bend, articulate, or otherwise move with greater freedom and without contacting the coverlay layer 600. Because the fuse 545 can bend, articulate, or otherwise move with greater freedom, the tab 520 can more readily be positioned or adjusted on the terminal 525 of the battery cell 120, which can facilitate or improve a subsequent welding operation to couple (e.g., weld) the tab 520 with the terminal 525. Because the fuse 545 can bend, articulate, or otherwise move without contacting the coverlay layer 600, the potential for damage to the fuse 545 or the coverlay layer 600 resulting from contact between the fuse 545 or the coverlay layer 600 can be reduced. The coverlay layer 600 can be positioned relative to the isolation layer 535 such that at least a portion of the notch 620 is positioned over the isolation layer 535. For example, the fuse 545 can be positioned between the isolation layer 535 and the notch 620.

Figure 7:
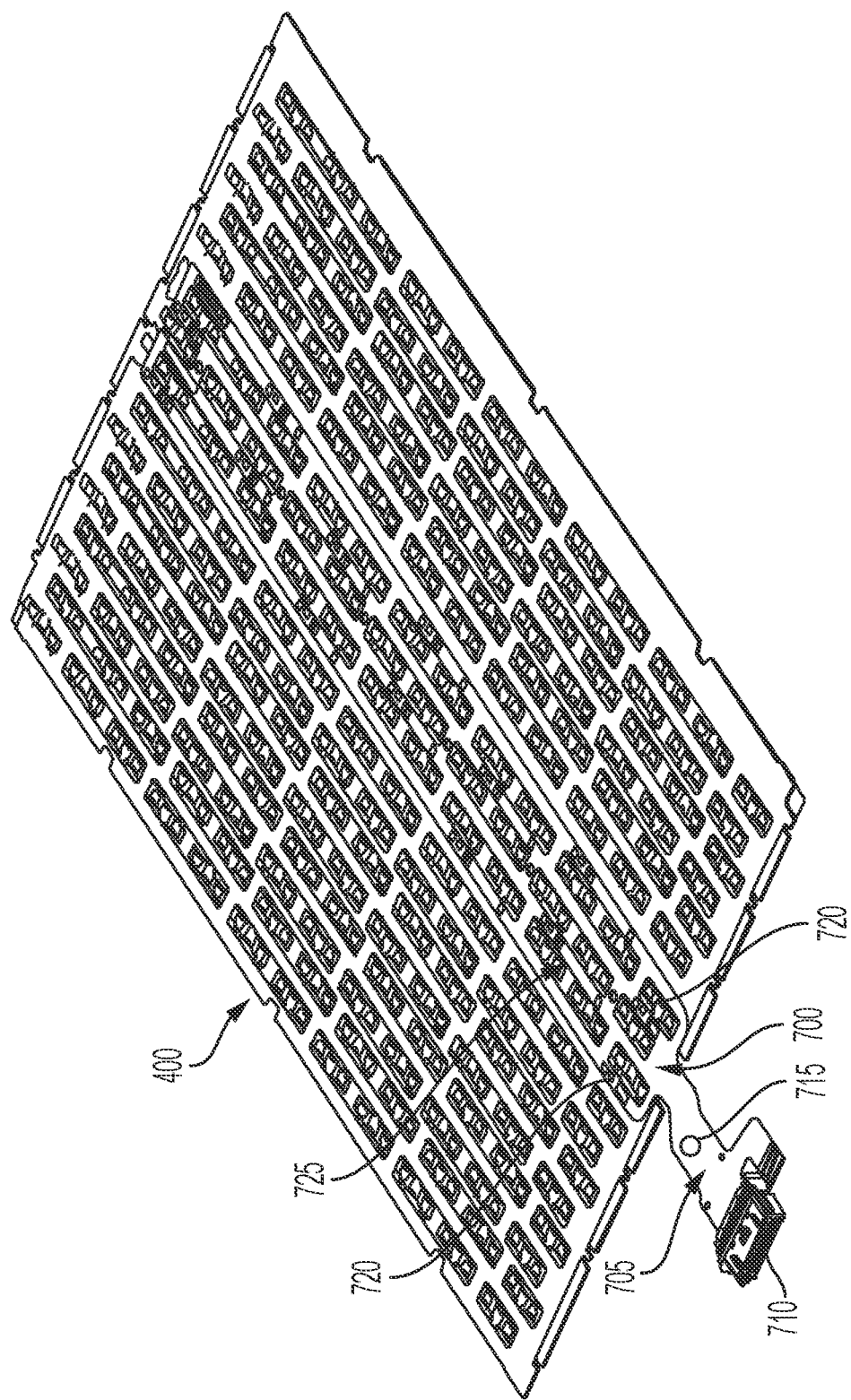
FIG. 7 depicts an example current collector and voltage sensing device, in accordance with some aspects.

As depicted in FIG. 7, among others, the current collector 400 can be electrically coupled with at least one apparatus 700. The apparatus 700 can include a voltage sensing device 700. For example, the voltage sensing device 700 can include a voltage sensing harness ("VSH") 700. The battery pack 110 or the battery module 115 can include a first voltage sensing harness 700 and a second voltage sensing harness 700, where the first voltage sensing harness 700 can include a first polarity (e.g., a negative polarity) and the second voltage sensing harness 700 can include a second polarity (e.g., a positive polarity). The voltage sensing harness 700 can include a connector portion 705. The connector portion 705 can include an electrical connector 710 and at least one connector apertures 715. For example, the electrical connector 710 can include a pin-style connector or some other style of connector configured to facilitate a mechanical or electrical coupling of the voltage sensing harness 700 with another component (e.g., a voltage monitoring module, a controller, or some other component). The connector portion 705 can include a ribbon cable extending from a main body of the voltage sensing harness 700. For example, the body 725 of the VSH can be positioned on (e.g., against, abutting) the current collector 400, and the connector portion 705 can extend from the body 725. The body 725 of the voltage sensing harness 700 can extend across or substantially across (e.g., across 90%) of a length of the current collector 400. The voltage sensing harness 700 can extend over a portion (e.g., 25%) of a width of the current collector 400.

The voltage sensing harness 700 can be electrically coupled with the current collector 400. For example, the voltage sensing harness 700 can be electrically coupled with the electrically conductive layer 500 of the current collector 400. The voltage sensing harness 700 can be electrically coupled with the electrically conductive layer 500 to monitor a voltage, current, or some other electrical or thermal property of the electrically conductive layer 500 or the current collector 400. For example, the voltage sensing harness 700 include at least one voltage sensing region 720. The voltage sensing region 720 can include an area, zone, or region of the voltage sensing harness 700. The voltage sensing harness 700 can include at least one voltage sensor or voltage sensing device within each voltage sensing region 720. For example, each voltage sensing region 720 can include a voltage sensor to measure voltage at a portion of the current collector 400 corresponding to the voltage sensing region 720. The voltage sensor can include an electromagnetic voltage sensor, a voltage-sensitive resistor, or a voltage sensor configured to measure current.

Figure 8:
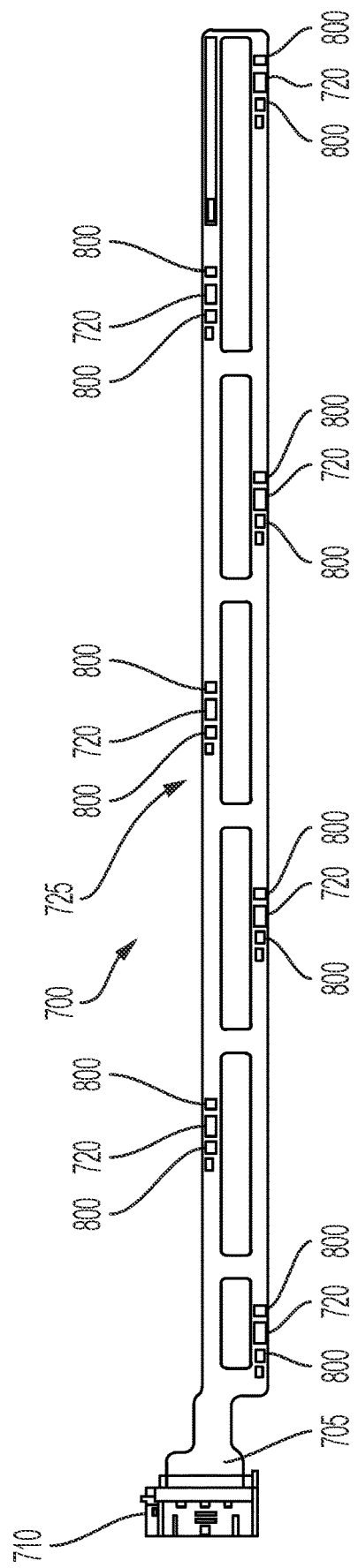
FIG. 8 depicts an example voltage sensing device, in accordance with some aspects.

As depicted in FIGS. 7 and 8, among others, the voltage sensing harness 700 can include multiple voltage sensing regions 720, each having a voltage sensor or voltage sensing device. The voltage sensing harness 700 can measure a voltage of an electrical component positioned adjacent to each voltage sensing region 720, namely a portion of the current collector 400. For example, the voltage sensing harness 700 can couple with the current collector 400 to measure a voltage of the current collector 400 within each voltage sensing region 720. The voltage sensing harness 700 can include one or more wires or cables to transmit a signal from the voltage sensor within a respective voltage sensing region 720 to the connector 710 via the connector portion 705. For example, the voltage sensing harness 700 can provide an indication of the voltage within each of the voltage sensing regions 720 to some other controller or monitoring device via the connector portion 705 and the connector 710. In addition to or in place of a voltage sensor, the voltage sensing harness 700 can include at least one sensor to measure a current, a temperature, a resistance, or some other electrical, thermal, or physically property of an area of the current collector 400 corresponding with a voltage sensing region 720. Because the voltage sensing harness 700 can include multiple voltage sensing regions 720, the voltage sensing harness 700 can include multiple sensors within each voltage sensing region 720 to measure some property of the current collector 400 at multiple locations corresponding to each of the voltage sensing regions 720. In this way, the voltage sensing harness 700 can take or facilitate the taking of multiple measurements over an area of the current collector 400 and transmit (e.g., provide) an indication of those measurements to some other device (e.g., a controller, a voltage management device) via the connector portion 705 and the connector 710.

Figure 11:
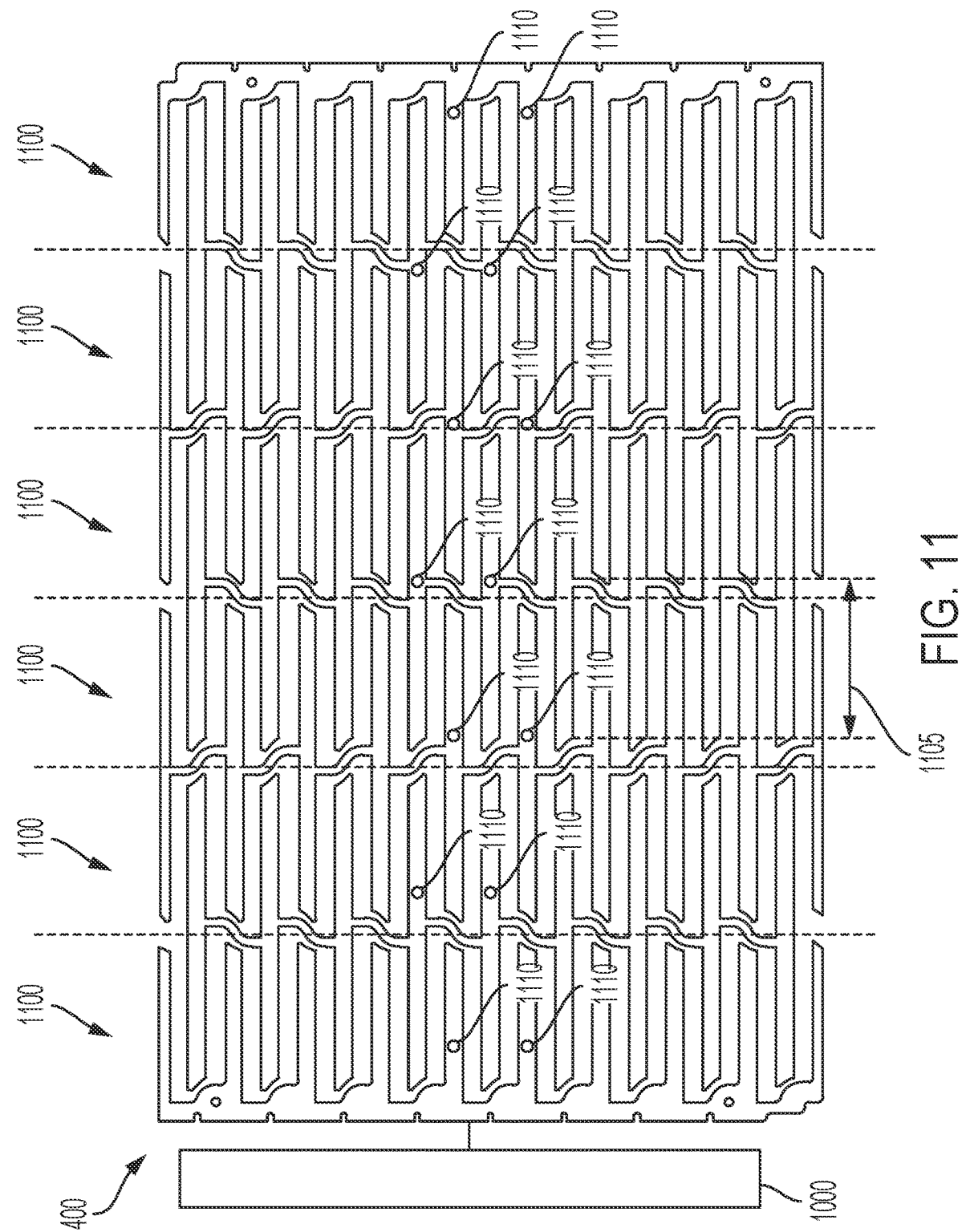
FIG. 11 depicts example voltage sensing regions of a current collector, in accordance with some aspects.
Figure 12:
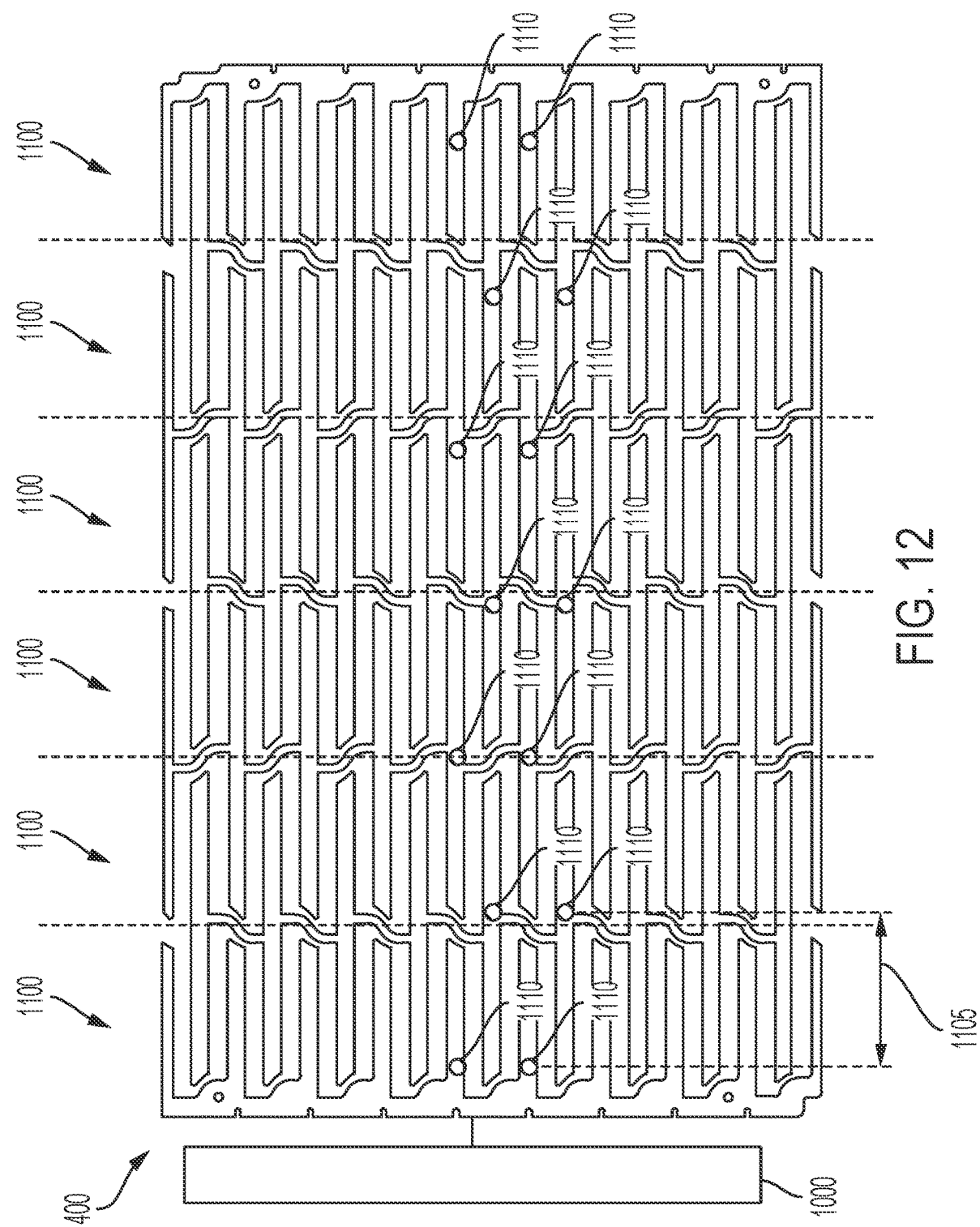
FIG. 12 depicts example voltage sensing regions of a current collector, in accordance with some aspects.

The voltage sensing harness 700 can be coupled with the current collector 400. For example, the voltage sensing harness 700 can be mechanically or electrically coupled with the current collector 400. The voltage sensing harness 700 can be welded (e.g., laser welded) with the current collector 400. For example, the voltage sensing harness 700 can be laser welded with the electrically conductive layer 500 of the current collector 400 to both mechanically couple and electrically couple the voltage sensing harness 700 with the current collector 400. The mechanical coupling of the voltage sensing harness 700 with the current collector 400 can prevent the voltage sensing harness 700 from separating from the current collector 400. The mechanical coupling of the voltage sensing harness 700 with the current collector 400 can align each of the voltage sensing regions 720 of the voltage sensing harness 700 with corresponding regions (e.g., regions 1110 as depicted in FIGS. 11 and 12). The electrical coupling of the voltage sensing harness 700 with the current collector 400 can facilitate (e.g., allow, permit) the measurement of voltage of the current collector 400 within each of the voltage sensing regions 720. The voltage sensing harness 700 can be mechanically coupled and electrically coupled with the current collector 400 at or proximate to (e.g., within five centimeters of or within some other distance of) the voltage sensing regions 720 of the voltage sensing harness 700. For example, each voltage sensing region 720 of the voltage sensing harness 700 can include at least one weld area 800 (e.g., spot, portion, region) within which a laser welding device can direct (e.g., shoot) a laser to laser weld the voltage sensing harness 700 with the current collector 400. Each voltage sensing region 720 can correspond to two or more weld areas 800 positioned on opposing sides of the voltage sensing region 720 or on opposing sides of the voltage sensing device within each voltage sensing region 720.

The voltage sensing harness 700 can include a single set of traces. For example, rather than including multiple redundant traces, the voltage sensing harness 700 can include a single set of traces (e.g., wires, cables, electrical circuits) for each voltage sensing region 720. The voltage sensing harness 700 can include a single voltage sensing region 720 for each section (e.g., sections 1100 as depicted in FIGS. 11 and 12) of the current collector 400 or battery module 115 rather than including multiple redundant voltage sensing regions 720 for each section of the current collector 400 or battery module 115 being measured. For example, as depicted in FIG. 8, the voltage sensing harness 700 can include a single voltage sensing region 720 for each section or portion of the voltage sensing harness 700, rather than two or more voltage sensing regions 720 per section or portion. The voltage sensing harness 700 can include a single trace fuse corresponding to the single voltage sensing region 720 per portion or section of the voltage sensing harness 700, for example.

Figure 9:
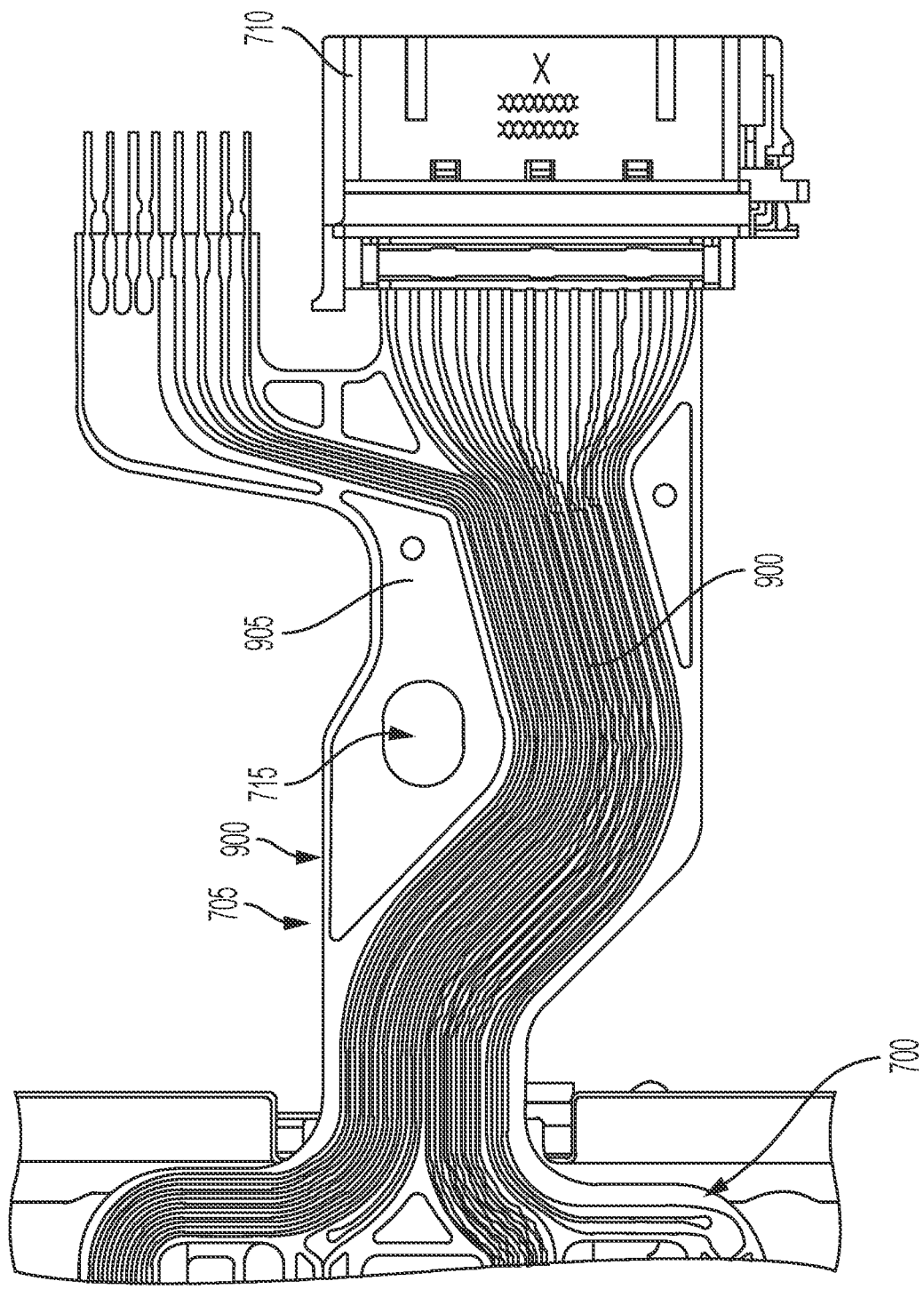
FIG. 9 depicts an example voltage sensing device and busbar, in accordance with some aspects.

As depicted in FIG. 9, the connector portion 705 can include a cable portion 900 and a non-cable portion 905. The cable portion 900 can include a portion of the connector portion 705 that is made of or includes at least one cable (e.g., wires, ribbon cables, electrically conductive components) to facilitate communication of an electrical signal through the connector portion 705. For example, the cable portion 900 can include multiple wires that can communicate an electrical signal from the voltage sensors of each of the voltage sensing regions 720 to the connector 710, where the connector 710 can then be electrically coupled with some other component (e.g., a voltage monitor, a controller, or some other component) to further communicate the same electrical signal to said other component. The non-cable portion 905 can include a portion of the connector portion 705 that does not include any wires or electrically conductive material. The non-cable portion 905 can include a structural region of the connector portion 705 to mechanically couple a first cable portion 900 with a second cable portion 900. The non-cable region 905 can include an insulative member or region of the connector portion 705 that can separate or electrically insulate a first cable portion 900 from a second cable portion 900. The non-cable portion 905 can be without any wires, cables, or other electrically conductive components.

The voltage sensing harness 700 can include the connector portion 705 defining the connector aperture 715. For example, the connector aperture 715 can include an opening, hole, void, gap, space, or passage formed through the connector portion 705. The connector aperture 715 can be circular, ovular, square, rectangular, or have some other cross-sectional shape. The connector aperture 715 can be positioned on the non-cable portion 905 of the connector portion 705. For example, the connector aperture 715 can be formed through an area or region of the connector portion 705 that does not include or require any electrical connections, wires, cables, or other electrically conductive elements. The connector aperture 715 can receive a retaining member. The connector aperture 715 can include a side, shape, or dimension such that the connector aperture 715 can receive the retaining member at least partially through the connector aperture 715. The retaining member can include a grommet pin, plug, press-fit connector, or some other fastener. For example, the retaining member can include a grommet pin or fastener having a shank portion and a head portion, where the shank portion can be received in or through the connector aperture 715 (e.g., the connector aperture 715 can include a diameter similar to a diameter of the shank portion), while the head portion can contact or abut the connector portion 705 (e.g., the non-cable portion) without passing through the connector aperture 715. The retaining member can include a non-electrically conductive component such that an electrical current cannot be conducted by the retaining member.

Figure 10:
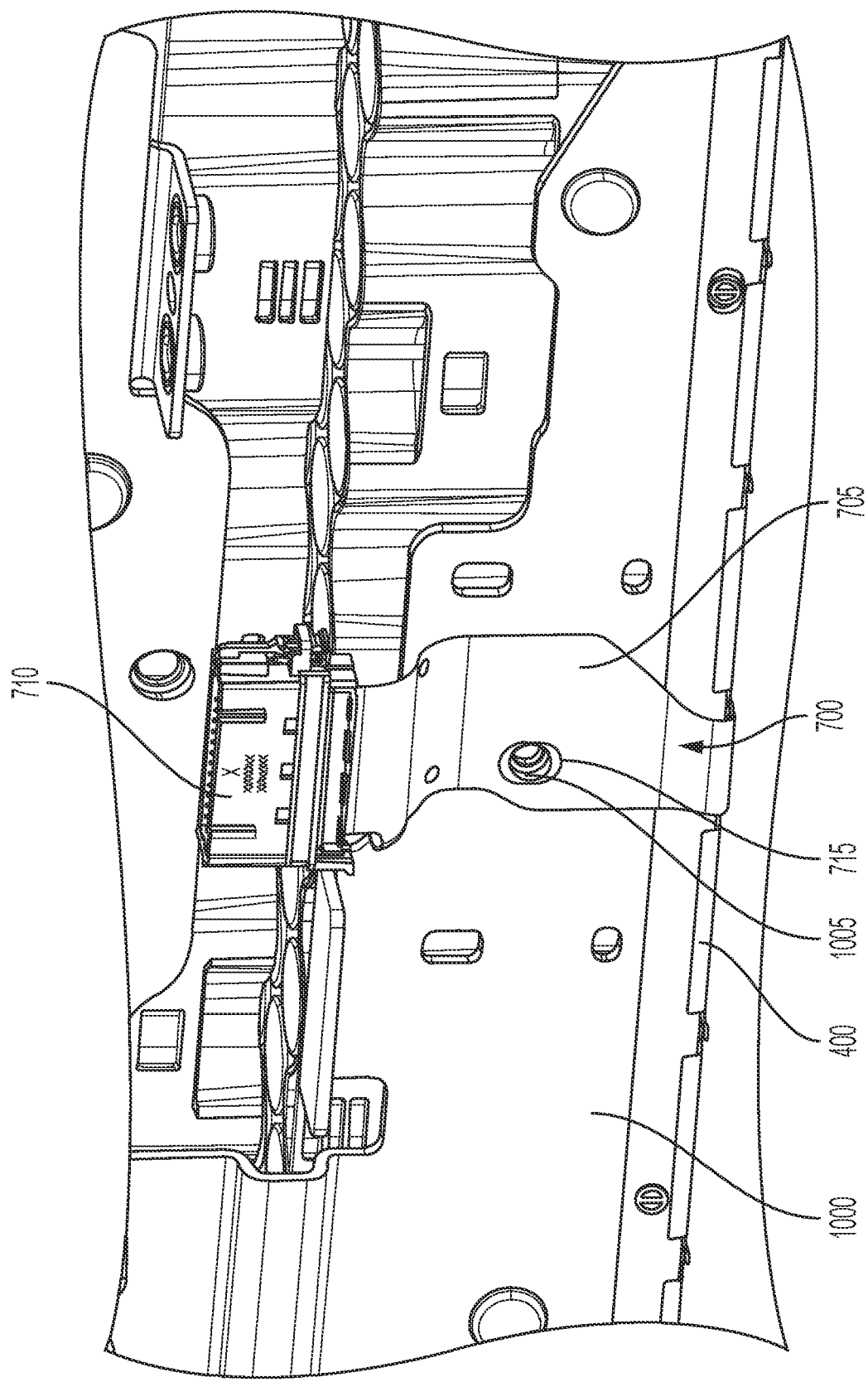
FIG. 10 depicts an example voltage sensing device, in accordance with some aspects.

As depicted in FIG. 10, among others, the voltage sensing harness 700 can include the connector portion 705 configured to couple with a busbar 1000. The busbar 1000 can include an electrically conductive member or structure of the battery module 115 that can conduct electricity from the current collector 400 to some other component (e.g., a drive unit of the vehicle 105, an electrical connector or contactor, or some other device). The busbar 1000 can include a busbar associated with one battery module 115 of multiple battery modules 115 within the battery pack 110. For example, the busbar 1000 can electrically couple one module 115 with another module 115 within the battery pack 110. The busbar 1000 can include the busbar 145 of the vehicle 105, the busbar 150 of the vehicle 105, or some other busbar. The busbar 1000 can define a busbar aperture 1005. The busbar aperture 1005 can include a hole, indent, opening, port, void, space, gap, or other opening in the busbar 1000. The busbar aperture 1005 can be formed partially or completely through the busbar 1000. The busbar aperture can receive the retaining member. The busbar aperture 1005 can include a side, shape, or dimension such that the busbar aperture 1005 can receive the retaining member at least partially through the busbar aperture 1005. For example, the retaining member or a portion of the retaining member can extend through the connector aperture 715 of the connector portion 705 of the voltage sensing harness 700 and then extend at least partially into the busbar aperture 1005 of the busbar 1000.

The voltage sensing harness 700 can be mechanically coupled with the busbar 1000. For example, the connector portion 705 of the voltage sensing harness 700 can be mechanically coupled, but not electrically coupled-with the busbar 1000 via the retaining member. The retaining member can be received by the busbar aperture 1005 of the busbar 1000 and the connector aperture 715 of the connector portion 705 simultaneously to couple the connector portion 705 with the busbar 1000. For example, the retaining member can be received by the busbar aperture 1005 of the busbar 1000 and the connector aperture 715 of the connector portion 705 with the busbar aperture 1005 and the connector aperture 715 at least partially aligned (e.g., overlapping, concentric, coaxial, or otherwise aligned). The retaining member can include a rubberized pin or other fastener that can retain the connector portion 705 of the voltage sensing harness 700 against the busbar 1000. For example, the connector portion 705 can be held against (e.g., touching, contacting) the busbar 1000 with the retaining member simultaneously engaged with the busbar aperture 1005 and the connector aperture 715. The connector portion 705 can be prevented from separating from the busbar 1000 with the connector portion 705 retained against the busbar 1000 via the retaining member.

As depicted in FIGS. 11-12, among others, the current collector 400 can include a plurality of sections 1100 (e.g., parallel groups or "P-Groups"). FIG. 11, among others can depict a first current collector 400 associated with one battery module 115 (e.g., a first battery module 115 of the vehicle 105). FIG. 12, among others, can depict a second current collector 400 associated with another battery module (e.g., a second battery module 115 of the vehicle 105). For example, the vehicle 105 can include two or more battery modules 115, each including multiple battery cells 120 that are electrically coupled by a current collector 400 associated with that battery module 115. Each section 1100 of the current collector 400 can be associated with a group of battery cells 120 of the battery module 115 and a portion of the current collector 400 (e.g., select tabs 505 and tabs 520) associated with the same group of battery cells 120. For example, the current collector 400 can define two sections 1100, three sections 1100, four sections 1100, five sections 1100, six sections 1100, or some other number of sections. The sections 1100 can be disposed along a length of the current collector 400. The voltage sensing harness 700 can be positioned on (e.g., against, electrically coupled with) the current collector 400 such that the voltage sensing harness 700 is laid across or extends at least partially into each of the sections 1100. For example, the voltage sensing harness 700 can be coupled with the current collector 400 such that one voltage sensing region 720 of the voltage sensing harness 700 can be positioned within each of the section 1100 of the current collector 400.

Each segment 1100 of the current collector 400 can include at least one voltage sensing region 1110. The voltage sensing region 1110 of the current collector 400 can include an area, region, zone, or location of a particular segment 1100 within which the voltage sensing harness 700 can obtain a voltage measurement or some other measurement. For example, the voltage sensing region 1110 within each segment 1100 can correspond to a voltage sensing region 720 of the voltage sensing harness 700. The voltage sensing harness 700 can be coupled with the current collector 400 such that each voltage sensing region 720 of the voltage sensing harness 700 is configured to take a voltage measurement (e.g., measure voltage with a voltage sensing device) within the voltage sensing region 1110 of each segment 1100. For example, each voltage sensing region 720 of the voltage sensing harness 700 can be at least partially aligned with (e.g., overlapping, contacting, abutting) one voltage sensing region 1110 of the current collector 400. Each of the plurality of voltage sensing regions 720 is configured to measure a voltage within one section 1100 of the current collector 400. For example, one voltage sensing region 720 of the voltage sensing harness 700 can measure a voltage within each of the sections 1100 of the current collector 400.

The voltage sensing harness 700 can include each of the plurality of voltage sensing regions 720 spaced apart from an adjacent voltage sensing region by a distance 1105. The current collector 400 can include each of the plurality of voltage sensing regions 1110 spaced apart by the distance 1105. For example, the distance 1105 can include a distance between adjacent voltage sensing regions 720, where the distance 1105 is uniform such that each of the voltage sensing regions 720 are spaced apart by a substantially equal (e.g., 95% equal) distance. Because the voltage sensing regions 720 are at least partially aligned with the corresponding voltage sensing regions 1110 of the current collector 400, each voltage sensing region 1110 can be spaced apart from an adjacent voltage sensing region by the uniform distance 1105.

Because the voltage sensing regions 720 of the voltage sensing harness 700 and the corresponding voltage sensing regions 1110 of the current collector 400 are spaced along the current collector 400 at equidistant intervals (e.g., the distance 1105), the contribution of each section 1100 (e.g., each P-group) of the current collector 400 an associated section of the battery module 115 can represent an equal contribution to the DCIR measurement of the battery module 115 or battery pack 110. The position of the voltage sensing regions 720, as dictated by the equidistant spacing by the distance 1105 as well as a position of an initial voltage sensing region 720 (which then determines where all other voltage sensing regions 720 are positioned) can cause a DCIR spread (e.g., a range of DCIR measurements) or an error or tolerance range for a DCIR measurement of the battery module 115 or battery pack 110 to be low. For example, the voltage sensing regions 720 of the voltage sensing harness 700 can be spaced apart from adjacent voltage sensing regions 720 by the distance 1105, where an initial voltage sensing region 720 (e.g., the left-most voltage sensing region 720 as shown in FIG. 11 or FIG. 12, among others) can be positioned in a particular location within the first section 1100 (e.g., the left-most section 1100) such that a measurement (e.g., a voltage measurement, a resistance measurement, a current measurement) within that initial voltage sensing region 720 of the first section 1100 and all subsequent measurements that follow in subsequent sections 1100 in voltage sensing regions 720 having a position dictated by the distance 1105 can be accurate and free from substantial error. As an example, the measured DCIR spread for a battery pack 110 or battery module 115 having the voltage sensing harness 700 with the voltage sensing regions 720 spaced apart by the distance 1105 can be approximately 1.5%.

Figure 13:
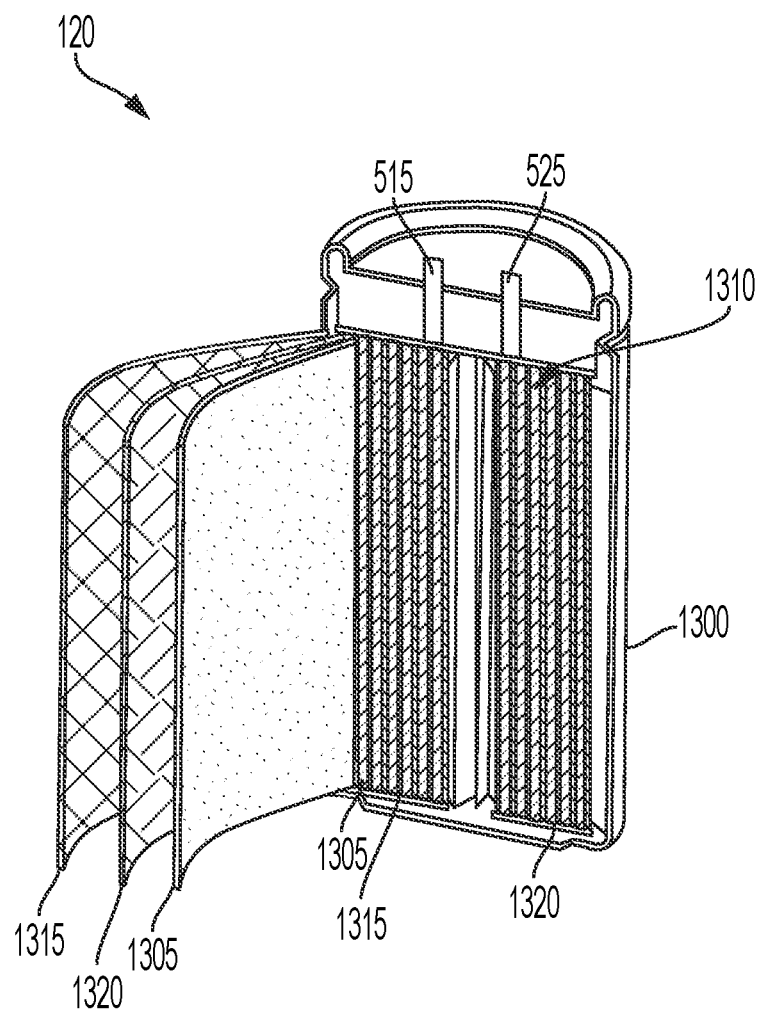
FIG. 13 depicts a cross sectional view of an example battery cell, in accordance with some aspects.
Figure 14:
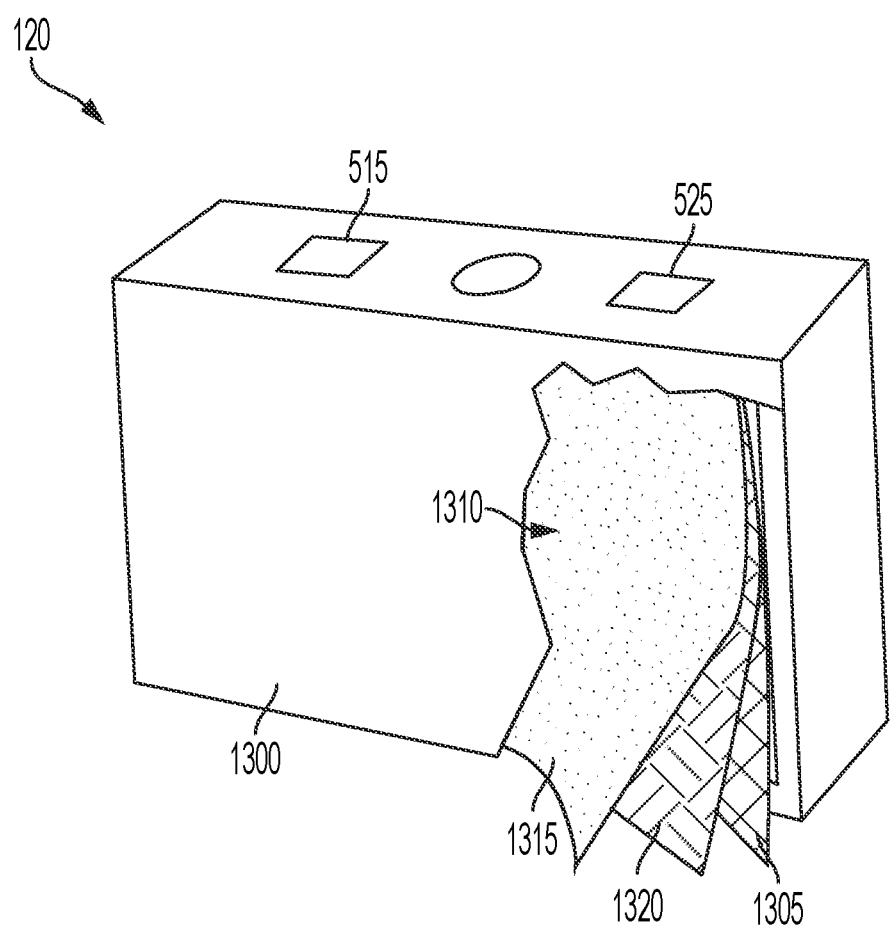
FIG. 14 depicts a cross sectional view of an example battery cell, in accordance with some aspects.
Figure 15:
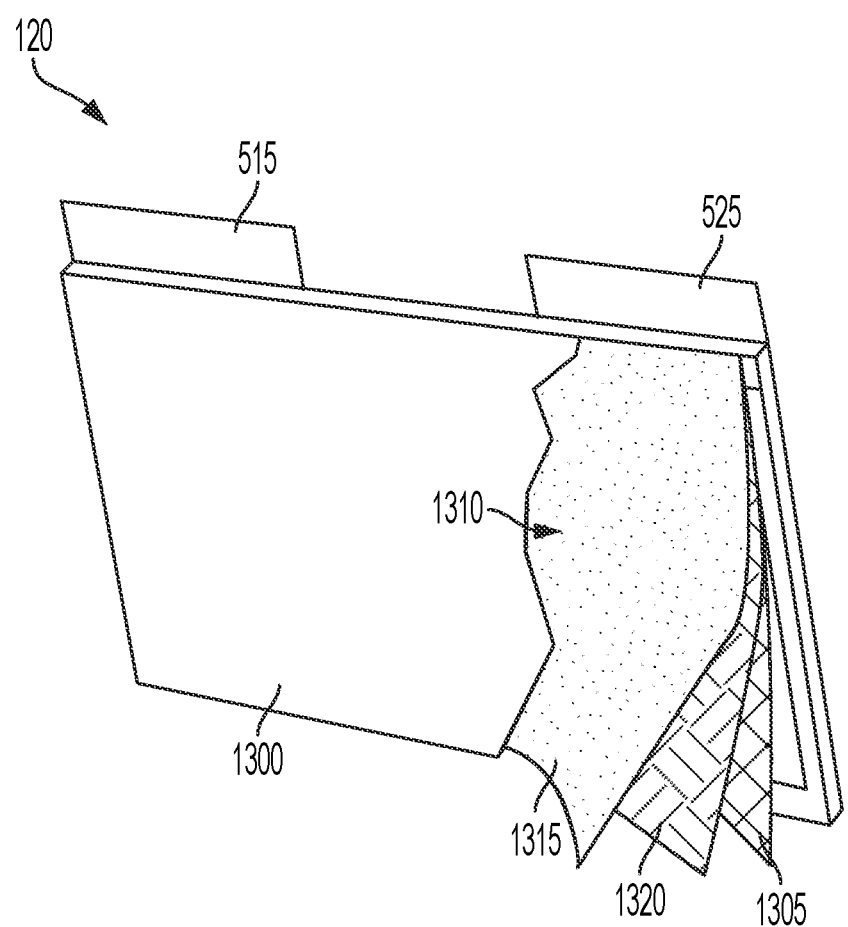
FIG. 15 depicts a cross sectional view of an example battery cell, in accordance with some aspects.

FIGS. 13, 14 and 15 depict an example cross sectional view of a battery cell 120. Battery cells 120 have a variety of form factors, shapes, or sizes. For example, battery cells 120 can have a cylindrical, rectangular, square, cubic, flat, pouch, elongated or prismatic form factor. As depicted in FIG. 13, for example, the battery cell 120 can be cylindrical. As depicted in FIG. 14, for example, the battery cell 120 can be prismatic. As depicted in FIG. 15, for example, the battery cell 120 can include a pouch form factor. Battery cells 120 can be assembled, for example, by inserting a winded or stacked electrode roll (e.g., a jelly roll) including electrolyte material into at least one battery cell housing 1300. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 1300 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 515 (e.g., a positive or anode terminal) and a second polarity terminal 525 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$. Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 1300 can be disposed in the battery module 115, the battery pack 110, or a battery array installed in the electric vehicle 105. The housing 1300 can be of any shape, such as cylindrical with a circular (e.g., as depicted in FIG. 13, among others), elliptical, or ovular base, among others. The shape of the housing 1300 can also be prismatic with a polygonal base, as shown in FIG. 14, among others. As shown in FIG. 15, among others, the housing 1300 can include a pouch form factor. The housing 1300 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 1300 of the battery cell 120 can include one or more materials with various electrical conductivity or thermal conductivity, or a combination thereof. The electrically conductive and thermally conductive material for the housing 1300 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 1300 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 1300 of the battery cell 120 is prismatic (e.g., as depicted in FIG. 14, among others) or cylindrical (e.g., as depicted in FIG. 13, among others), the housing 1300 can include a rigid or semi-rigid material such that the housing 1300 is rigid or semi-rigid (e.g., not easily deformed or manipulated into another shape or form factor). In examples where the housing 1300 includes a pouch form factor (e.g., as depicted in FIG. 15, among others), the housing 1300 can include a flexible, malleable, or non-rigid material such that the housing 1300 can be bent, deformed, manipulated into another form factor or shape.

The battery cell 120 can include at least one anode layer 1305, which can be disposed within the cavity 1310 defined by the housing 1300. The anode layer 1305 can include a first redox potential. The anode layer 1305 can receive electrical current into the battery cell 120 and output electrons during the operation of the battery cell 120 (e.g., charging or discharging of the battery cell 120). The anode layer 1305 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 1315 (e.g., a composite cathode layer compound cathode layer, a compound cathode, a composite cathode, or a cathode). The cathode layer 1315 can include a second redox potential that can be different than the first redox potential of the anode layer 1305. The cathode layer 1315 can be disposed within the cavity 1310. The cathode layer 1315 can output electrical current out from the battery cell 120 and can receive electrons during the discharging of the battery cell 120. The cathode layer 1315 can also receive lithium ions during the discharging of the battery cell 120. Conversely, the cathode layer 1315 can receive electrical current into the battery cell 120 and can output electrons during the charging of the battery cell 120. The cathode layer 1315 can release lithium ions during the charging of the battery cell 120.

The battery cell 120 can include a layer 1320 disposed within the cavity 1310. The layer 1320 can include a solid electrolyte layer. The layer 1320 can include a separator wetted by a liquid electrolyte. The layer 1320 can include a polymeric material. The layer 1320 can include a polymer separator. The layer 1320 can be arranged between the anode layer 1305 and the cathode layer 1315 to separate the anode layer 1305 and the cathode layer 1315. The polymer separator can physically separate the anode and cathode from a cell short circuit. A separator can be wetted with a liquid electrolyte. The liquid electrolyte can be diffused into the anode layer 1305. The liquid electrolyte can be diffused into the cathode layer 1315. The layer 1320 can help transfer ions (e.g., $Li^+$ ions) between the anode layer 1305 and the cathode layer 1315. The layer 1320 can transfer $Li^+$ cations from the anode layer 1305 to the cathode layer 1315 during the discharge operation of the battery cell 120. The layer 1320 can transfer lithium ions from the cathode layer 1315 to the anode layer 1305 during the charge operation of the battery cell 120.

The redox potential of layers (e.g., the first redox potential of the anode layer 1305 or the second redox potential of the cathode layer 1315) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 1315). Lithium-ion batteries can include a graphite chemistry, a silicon-graphite chemistry, or a lithium metal chemistry for the anode layer (e.g., the anode layer 1305).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4O_x$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 1315). Lithium-ion batteries can include a graphite chemistry, a silicon-graphite chemistry, or a lithium metal chemistry for the anode layer (e.g., the anode layer 1305). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 1315) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 1305) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The layer 1320 can include or be made of a liquid electrolyte material. For example, the layer 1320 can be or include at least one layer of polymeric material (e.g., polypropylene, polyethylene, or other material) including pores that are wetted (e.g., saturated with, soaked with, receive, are filled with) a liquid electrolyte substance to enable ions to move between electrodes. The liquid electrolyte material can include a lithium salt dissolved in a solvent. The lithium salt for the liquid electrolyte material for the layer 1320 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. Liquid electrolyte is not necessarily disposed near the layer 1320, but the liquid electrolyte can fill the battery cells 120 in many different ways. The layer 1320 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the layer 1320 includes a liquid electrolyte material, the layer 1320 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 1320 can include at least one additive. The additives can be or include vinylidene carbonate, fluoroethylene carbonate, ethyl propionate, methyl propionate, methyl acetate, ethyl acetate, or a mixture of any two or more thereof. The layer 1320 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the layer 1320 from greater than 0 M to about 1.5 M. Once disposed to the battery cell 120, liquid electrolyte can be present and touching battery subcomponents present within the battery cell 120. The battery subcomponents can include the cathode, the anode, the separator, the current collector, etc.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, the polarity of a battery cell terminal can be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A current collector, comprising:
    a first electrically conductive layer configured to electrically couple to a first battery cell and a second battery cell with an interstitial area between the first battery cell and the second battery cell;
    a coverlay layer coupled to the first electrically conductive layer;
    a second electrically conductive layer configured to electrically couple to a third battery cell; and
    a non-electrically conductive isolation layer defining an aperture, the aperture to form a path through the isolation layer to the interstitial area, the isolation layer positioned at least partially between the first electrically conductive layer and the second electrically conductive layer to electrically insulate the first electrically conductive layer from the second electrically conductive layer.

2. The current collector of claim 1, comprising:
    the aperture of the isolation layer to define the path through the isolation layer into the interstitial area, the aperture is configured to direct potting material to flow through the isolation layer into the interstitial area via the path.

3. The current collector of claim 1, comprising:
    the aperture of the isolation layer to define the path through the isolation layer into the interstitial area, the aperture is configured to direct potting material to flow through the isolation layer into the interstitial area via the path, wherein the interstitial area is configured to be substantially filled with the potting material directed through the aperture.

4. The current collector of claim 1, comprising:
    at least a portion of the isolation layer positioned with the first electrically conductive layer to a side of the isolation layer and with the first battery cell and the second battery cell to an opposite side of the isolation layer.

5. The current collector of claim 1, comprising:
    the first electrically conductive layer positioned at least partially between the coverlay layer and the isolation layer.

6. The current collector of claim 1, comprising:
    the coverlay layer comprising a notch; and
    the first electrically conductive layer positioned at least partially between the coverlay layer and the isolation layer, the first electrically conductive layer comprising a fuse, the fuse positioned relative to the coverlay layer such that the notch of the coverlay layer is positioned over at least a portion of the fuse.

7. The current collector of claim 1, comprising:
    the coverlay layer comprising a notch; and
    the first electrically conductive layer positioned at least partially between the coverlay layer and the isolation layer, the first electrically conductive layer comprising a fuse, the fuse positioned relative to the coverlay layer such that the notch of the coverlay layer is positioned over at least a portion of the fuse, the isolation layer positioned relative to the coverlay layer such that the notch of the coverlay layer is positioned over at least a portion of the isolation layer.

8. A current collector, comprising:
    a coverlay layer; and
    an electrically conductive layer comprising a tab and a fuse, the electrically conductive layer coupled with the coverlay layer, the tab to electrically couple the electrically conductive layer with a plurality of battery cells, the plurality of battery cells defining an interstitial area; and
    an isolation layer defining an aperture, the aperture having a profile corresponding to a profile of the electrically conductive layer, the isolation layer to form a path through the isolation layer to the interstitial area.

9. The current collector of claim 8, wherein the isolation layer is at least partially electrically non-conductive.

10. The current collector of claim 8, comprising:
    the tab configured to electrically couple the electrically conductive layer with a first terminal of a first battery cell of the plurality of battery cells, the first terminal comprising an area, wherein the tab is positioned relative to the first terminal such that the tab is positioned over at least 80% of the area of the first terminal.

11. The current collector of claim 8, wherein the tab is a first tab, the first tab configured to electrically couple the electrically conductive layer with a first terminal of a first battery cell of the plurality of battery cells, the current collector comprising:
    a second tab comprising a second fuse, the second tab configured to electrically couple the electrically conductive layer with a second terminal of a second battery cell of the plurality of battery cells, wherein the first tab is a button-style tab and the second tab is a rim-style tab.

12. The current collector of claim 8, wherein the plurality of battery cells includes a first battery cell and a second battery cell, wherein the tab is a first tab, the first tab configured to electrically couple the electrically conductive layer with a first terminal of the first battery cell, the current collector comprising:
 a second tab configured to electrically couple the electrically conductive layer with a second terminal of the first battery cell and a third terminal of a second battery cell; and
 the first terminal comprising an area, wherein the tab is positioned relative to the first terminal such that the tab is positioned over at least 80% of the area of the first terminal.

13. The current collector of claim 8, wherein the plurality of battery cells includes a first battery cell and wherein the tab is a first tab, the first tab configured to electrically couple the electrically conductive layer with a first terminal of the first battery cell, the first terminal having a first polarity, the current collector comprising:
 a second tab configured to electrically couple the electrically conductive layer with a second terminal of a second battery cell of the plurality of battery cells, the second terminal having the first polarity; and
 wherein the isolation layer is non-electrically non-conductive.

14. An apparatus for an electric vehicle, comprising:
 a voltage sensing device comprising a plurality of voltage sensing regions and configured to couple with a current collector to measure a voltage of the current collector within the plurality of voltage sensing regions, each of the plurality of voltage sensing regions spaced apart from an adjacent voltage sensing region by a distance;
 the voltage sensing device including a connector portion including a non-cable portion and a cable portion, the non-cable portion defining a connector aperture, the connector portion configured to couple with a busbar via a non-electrically conductive retaining member having a grommet.

15. The apparatus of claim 14, comprising:
 the retaining member configured to be received by a busbar aperture of the busbar via the connector aperture of the connector portion with the busbar aperture and the connector aperture at least partially aligned.

16. The apparatus of claim 14, wherein each of the plurality of voltage sensing regions is configured to measure a voltage within a section of the current collector.

17. The apparatus of claim 14, wherein the voltage sensing device includes one trace for each of the plurality of voltage sensing regions.

\* \* \* \* \*